US011516711B2

(12) United States Patent
Oketani et al.

(10) Patent No.: US 11,516,711 B2
(45) Date of Patent: *Nov. 29, 2022

(54) APPARATUS, METHOD, SYSTEM, PROGRAM AND RECORDING MEDIUM RELATED TO BEAMFORMING

(71) Applicant: NEC CORPORATION, Tokyo (JP)

(72) Inventors: Kengo Oketani, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 17/077,238

(22) Filed: Oct. 22, 2020

(65) Prior Publication Data

US 2021/0045022 A1 Feb. 11, 2021

Related U.S. Application Data

(63) Continuation of application No. 16/321,749, filed as application No. PCT/JP2017/024584 on Jul. 5, 2017, now Pat. No. 10,849,027.

(30) Foreign Application Priority Data

Aug. 3, 2016 (JP) ................. 2016-152618

(51) Int. Cl.
*H04W 36/00* (2009.01)
*H04B 7/06* (2006.01)
(Continued)

(52) U.S. Cl.
CPC ...... *H04W 36/0044* (2013.01); *H04B 7/0634* (2013.01); *H04B 7/0695* (2013.01);
(Continued)

(58) Field of Classification Search
None
See application file for complete search history.

(56) References Cited

U.S. PATENT DOCUMENTS 9,560,561 B2 1/2017 Son
10,396,873 B2 8/2019 Guey
(Continued)

FOREIGN PATENT DOCUMENTS

CN 1969479 A 5/2007
CN 103002526 A 3/2013
(Continued)

OTHER PUBLICATIONS

Chinese Office Communication for CN Application No. 201780047632.5 dated Sep. 1, 2021 with English Translation.
(Continued)

*Primary Examiner* — Hong S Cho
(74) *Attorney, Agent, or Firm* — Sughrue Mion, PLLC

(57) ABSTRACT

[Object] To make it possible to further increase a possibility of a success in a handover.
[Solution] A first apparatus of the present invention includes: a first communication processing unit configured to transmit reference signals using beamforming; and a second communication processing unit configured to receive a handover message from a source base station of a handover of a terminal apparatus. The handover message includes beam related information related to a beam. The first communication processing unit is configured to receive an access signal of the terminal apparatus based on the beam related information.

10 Claims, 16 Drawing Sheets

(51) Int. Cl.
*H04W 16/28* (2009.01)
*H04W 36/08* (2009.01)

(52) U.S. Cl.
CPC ....... *H04W 16/28* (2013.01); *H04W 36/0055* (2013.01); *H04W 36/08* (2013.01)

(56) References Cited

U.S. PATENT DOCUMENTS

| | | | |
|---|---|---|---|
| 10,736,009 B2 * | 8/2020 | Xu | H04W 74/004 |
| 2006/0003767 A1 | 1/2006 | Kim et al. | |
| 2009/0274120 A1 | 11/2009 | Chou | |
| 2012/0039181 A1 | 2/2012 | Aziz et al. | |
| 2012/0214490 A1 | 8/2012 | Kobayashi | |
| 2012/0320874 A1 | 12/2012 | Li et al. | |
| 2013/0017856 A1 | 1/2013 | Murias et al. | |
| 2013/0083774 A1 | 4/2013 | Son et al. | |
| 2014/0073329 A1 | 3/2014 | Kang et al. | |
| 2014/0153423 A1 | 6/2014 | Shin et al. | |
| 2014/0194124 A1 | 7/2014 | Xiao et al. | |
| 2014/0328327 A1 | 11/2014 | Xiao et al. | |
| 2015/0063304 A1 * | 3/2015 | Koyanagi | H04W 48/18 370/331 |
| 2016/0142959 A1 | 5/2016 | Wang et al. | |
| 2016/0183234 A1 | 6/2016 | Sung et al. | |
| 2016/0345216 A1 | 11/2016 | Kishiyama et al. | |
| 2017/0215117 A1 | 7/2017 | Kwon | |
| 2017/0238222 A1 | 8/2017 | Jiang et al. | |
| 2019/0223058 A1 | 7/2019 | Fukui et al. | |

FOREIGN PATENT DOCUMENTS

| | | |
|---|---|---|
| CN | 103220704 A | 7/2013 |
| CN | 103765792 A | 4/2014 |
| CN | 103828257 A | 5/2014 |
| CN | 103916918 A | 7/2014 |
| CN | 105025579 A | 11/2015 |
| CN | 105101307 A | 11/2015 |
| CN | 105792343 A | 7/2016 |
| JP | 2008-501283 A | 1/2008 |
| JP | 2009-273124 A | 11/2009 |
| JP | 2014036317 A | 2/2014 |
| JP | 2014-531852 A | 11/2014 |
| WO | 2013/048212 A2 | 4/2013 |
| WO | 2015/115376 A1 | 8/2015 |
| WO | 2016/065590 A1 | 5/2016 |
| WO | 2016/114623 A1 | 7/2016 |
| WO | 2018/066103 A1 | 4/2018 |

OTHER PUBLICATIONS

EP Office Action for EP Application No. 17836663.9 dated Sep. 15, 2021.
ZTE Technology Journal, Handover scheme in Coordinated Multi-Point transmission system, Autor: Xiaodong Xu, Xin Chen, Jingya Li, Feb. 10, 2010.
Mobile Communications, Analysis and suggestions for TD-LTE cell handover technology, Autor: Changqing Zhang, Jan. 30, 2013.
Written Opinion dated Sep. 26, 2017 issued by the International Searching Authority in International Application No. PCT/JP2017/024584.
Catt et al., "Impact analysis of AAS on SON", 3GPp TSG RAN WG3 Meeting #81, R3-131558, Aug. 19-23, 2013, total 3 pages.
International Search Report for PCT/JP2017/024584 dated Sep. 26, 2017 (PCT/ISA/210).
Fujitsu, "Discussions on the procedure and related issues of cell splitting", 3GPP TSG-RAN WG3 Meeting #81, R3-131336, Aug. 19-23, 2013, total 3 pages.
"Mobility type support in NR", Intel Corporation, 3GPP TSG RAN WG2 Meeting #95bis, R2-166875, Oct. 10-14, 2016, pp. 1-6.
Communication dated May 22, 2019 from European Patent Office in counterpart EP Application No. 17836663.9.
Communication dated Aug. 24, 2020 from the China National Intellectual Property Administration in Application No. 201780047632.5.
Communication dated Mar. 30, 2020, issued by the United States Patent Office in counterpart U.S. Appl. No. 16/321,749.
JP Office Action for JP Application No. 2021-064113, dated Jun. 7, 2022 with English Translation.
EP Office Action for EP Application No. 17836663.9, dated Jul. 19, 2022.
Huawei et al., "Allocation of appropriate RACH resources for handover", 3GPP TSG-RAN WG2 Meeting #98, Hangzhou. China, May 15-19, 2017,R2-1704843, pp. 1-5.
Qualcomm Incorporated, "Beam-aware Intra-NR mobility with RRC involvement", 3GPP TSG-RAN WG2 Meeting #97bis, Spokane, USA, Apr. 3-7, 2017, R2-1703565, pp. 1-3.

* cited by examiner

_US 11,516,711 B2_

APPARATUS, METHOD, SYSTEM, PROGRAM AND RECORDING MEDIUM RELATED TO BEAMFORMING

CROSS REFERENCE TO RELATED APPLICATIONS

This application is a Continuation Application of U.S. application Ser. No. 16/321,749, filed on Jan. 29, 2019, which is a National Stage of International Application No. PCT/JP2017/024584 filed Jul. 5, 2017, claiming priority based on Japanese Patent Application No. 2016-152618 filed Aug. 3, 2016, the disclosure of which is incorporated herein in its entirety by reference.

BACKGROUND

Technical Field

The present invention relates to an apparatus, a method, a system, a program, and a recording medium related to beamforming.

Background Art

In order to achieve a drastic increase in the capacity of mobile networks, not only currently used frequency bands such as a several hundred megahertz band and a several gigahertz band but also a higher frequency band such as a several ten gigahertz band may be used. In particular, in the Fifth Generation (5G), in order to make the most use of such a band, studies are made on transferring signals to users by forming narrow directional beams using a large number of antennas.

In a higher frequency band, in order to compensate a large propagation loss, it is conceivable to use beamforming for the transmission of not only system information and paging information but also all of downlink signals/downlink channels including common pilot signals, reference signals or the like. Similarly, as for uplink, in order to compensate a propagation loss, it is also conceivable to use beamforming for the reception of all uplink signals/uplink channels.

For example, PTL 1 discloses an art in which a downlink beam ID and an uplink beam ID are included in a HANDOVER REQUEST message transmitted to a target base station from a source base station of a handover of a terminal apparatus. Further, according to PTL 1, the downlink beam ID is used for designating a downlink beam for transmitting data to the terminal apparatus after the handover, and the uplink beam ID is used for designating an uplink beam for receiving data from the terminal apparatus after the handover. This makes it possible to omit an operation for selecting beams at the time of the handover, leading to a reduction in delay of the handover.

CITATION LIST

Patent Literature

[PTL 1] JP2014-531852T

SUMMARY

Technical Problem

According to the art disclosed in PTL 1, however, a propagation loss is compensated in the transmission/reception of data after the handover, but a propagation loss is not compensated in the transmission/reception of control signals between the terminal apparatus and the target base station in the handover. In particular, it may not be possible for the target base station to receive an access signal (for example, an uplink signal in random access) of the terminal apparatus due to a large propagation loss. This, as a result, leads to a possibility of an increased failure rate of the handover.

It is an example object of the present invention to make it possible to increase a possibility of a success of a handover.

Solution to Problem

A first apparatus according to an example aspect of the present invention includes: a first communication processing unit configured to transmit reference signals using beamforming; and a second communication processing unit configured to receive a handover message from a source base station of a handover of a terminal apparatus. The handover message includes beam related information related to a beam. The first communication processing unit is configured to receive an access signal of the terminal apparatus based on the beam related information.

A second apparatus according to an example aspect of the present invention includes: a first communication processing unit configured to receive, from a terminal apparatus, first beam related information related to a beam, the first beam related information being information for a base station which transmits reference signals using beamforming; and a second communication processing unit configured to transmit, to the base station, a handover message including second beam related information corresponding to the first beam related information. The second beam related information is information to be used by the base station to receive an access signal of the terminal apparatus.

A third apparatus according to an example aspect of the present invention includes: a reception processing unit configured to receive reference signals transmitted by a first base station using beamforming; and a transmission processing unit configured to transmit, to a second base station, first beam related information related to a beam, the first beam related information being information for the first base station. The first beam related information corresponds to second beam related information to be used by the first base station to receive an access signal.

A first method according to an example aspect of the present invention includes: transmitting reference signals using beamforming; receiving a handover message from a source base station of a handover of a terminal apparatus, the handover message including beam related information related to a bean and receiving an access signal of the terminal apparatus based on the beam related information.

A second method according to an example aspect of the present invention includes: receiving, from a terminal apparatus, first beam related information related to a beam, the first beam related information being information for a base station which transmits reference signals using beamforming; and transmitting, to the base station, a handover message including second beam related information corresponding to the first beam related information. The second beam related information is information to be used by the base station to receive an access signal of the terminal apparatus.

A third method according to an example aspect of the present invention includes: receiving reference signals transmitted by a first base station using beamforming; and transmitting, to a second base station, first beam related information related to a beam, the first beam related information being information for the first base station. The first beam related information corresponds to second beam related information to be used by the first base station to receive an access signal.

A system according to an example aspect of the present invention includes: a first base station, a second base station, and a terminal apparatus. The first base station is configured to transmit reference signals using beamforming. The terminal apparatus is configured to receive the reference signals, and transmit, to the second base station, first beam related information related to a beam, the first beam related information being information for the first base station. The second base station is configured to transmit, to the first base station, a handover message including second beam related information corresponding to the first beam related information. The first base station is configured to receive an access signal of the terminal apparatus based on the second beam related information.

A first program according to an example aspect of the present invention is a program for causing a processor to execute; transmitting reference signals using beamforming; receiving a handover message from a source base station of a handover of a terminal apparatus, the handover message including beam related information related to a beam; and receiving an access signal of the terminal apparatus based on the beam related information.

A second program according to an example aspect of the present invention is a program for causing a processor to execute: receiving, from a terminal apparatus, first beam related information related to a beam, the first beam related information being information for a base station which transmits reference signals using beamforming; and transmitting, to the base station, a handover message including second beam related information corresponding to the first beam related information. The second beam related information is information to be used by the base station to receive an access signal of the terminal apparatus.

A third program according to an example aspect of the present invention is a program for causing a processor to execute: receiving reference signals transmitted by a first base station using beamforming; and transmitting, to a second base station, first beam related information related to a beam, the first beam related information being information for the first base station. The first beam related information corresponds to second beam related information to be used by the first base station to receive an access signal.

A first recording medium according to an example aspect of the present invention is a computer-readable non-transitory recording medium having recorded thereon a program for causing a processor to execute: transmitting reference signals using beamforming; receiving a handover message from a source base station of a handover of a terminal apparatus, the handover message including beam related information related to a beam; and receiving an access signal of the terminal apparatus based on the beam related information.

A second recording medium according to an example aspect of the present invention is a computer-readable non-transitory recording medium having recorded thereon a program for causing a processor to execute: receiving, from a terminal apparatus, first beam related information related to a beam, the first beam related information being information for a base station which transmits reference signals using beamforming; and transmitting, to the base station, a handover message including second beam related information corresponding to the first beam related information. The second beam related information is information to be used by the base station to receive an access signal of the terminal apparatus.

A third recording medium according to an example aspect of the present invention is a computer-readable non-transitory recording medium having recorded thereon a program for causing a processor to execute: receiving reference signals transmitted by a first base station using beamforming; and transmitting, to a second base station, first beam related information related to a beam, the first beam related information being information for the first base station. The first beam related information corresponds to second beam related information to be used by the first base station to receive an access signal.

Advantageous Effects of Invention

According to an example aspect the present invention, it is possible to increase a possibility of a success of a handover. Note that the present invention may provide other effects in place of or together with the above effect.

DESCRIPTION OF THE EXAMPLE EMBODIMENTS

Figure 1:
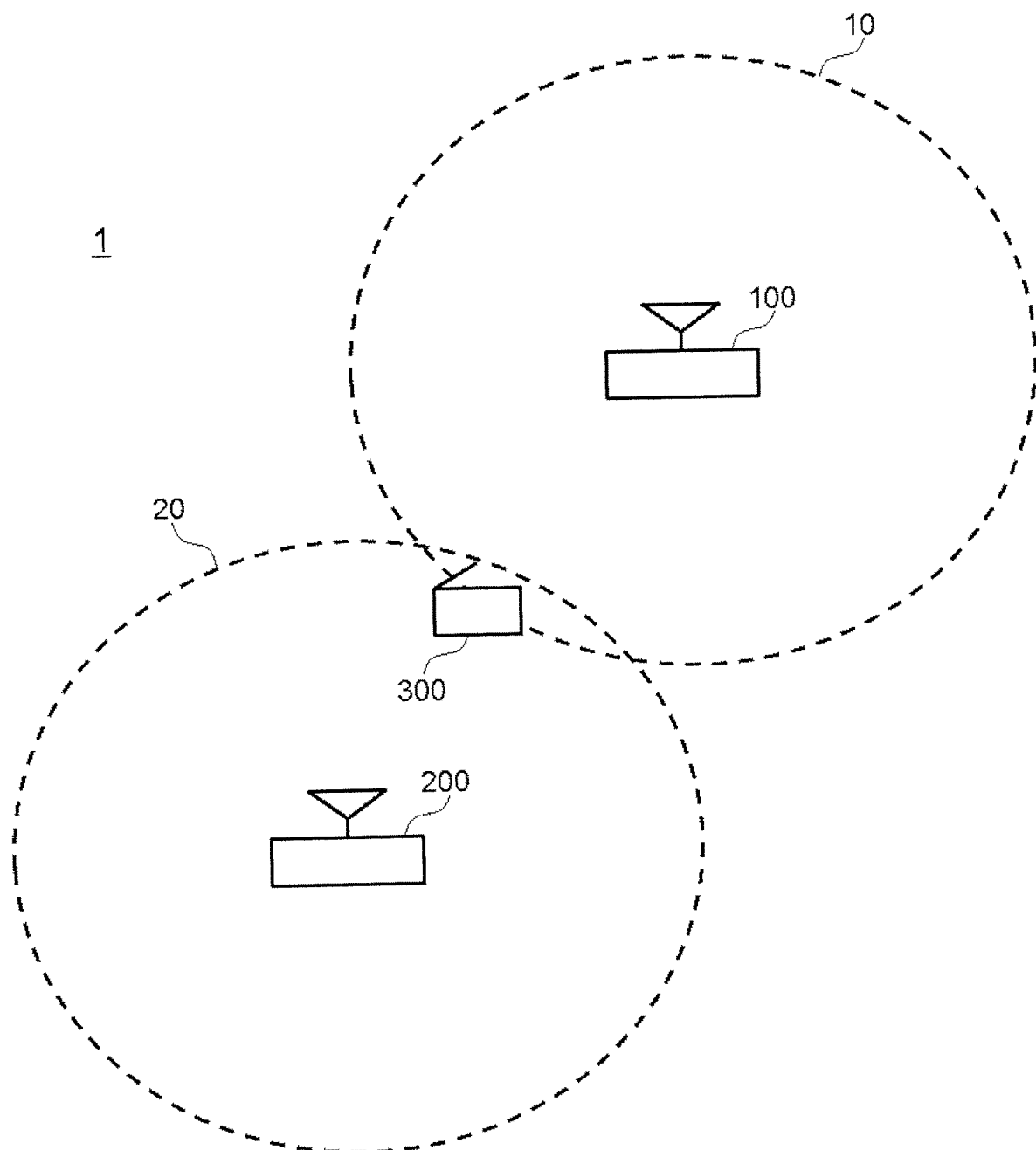
FIG. 1 is an explanatory diagram illustrating an example of the schematic configuration of a system according to a first example embodiment of the present invention.

Hereinafter, example embodiments of the present invention will be described in detail with reference to the accompanying drawings. Note that, in the specification and the drawings, elements whose descriptions can be the same may be denoted by the same reference signs, thereby omitting overlapping descriptions.

The description will be given in the following order.
1. Outline of Example Embodiments of Present Invention
2. First Example Embodiment
2.1. Configuration of System
2.2. Configuration of Base Station 100
2.3. Configuration of Base Station 200
2.4. Configuration of Terminal Apparatus 300
2.5. Technical Features
2.6. Example alterations
3. Second Example Embodiment
3.1. Configuration of System
3.2. Configuration of Base Station 500
3.3. Configuration of Base Station 600
3.4. Configuration of Terminal Apparatus 700
3.5. Technical Features 1. Outline of Example Embodiments of Present Invention The outline of the example embodiments of the present invention will be described first.

(1) Technical Problem

In order to achieve a drastic increase in the capacity of mobile networks, not only currently used frequency bands such as a several hundred megahertz band and a several gigahertz band but also a higher frequency band such as a several ten gigahertz band may be used. In particular, in the Fifth Generation (5G), in order to make the most use of such a band, studies are made on transferring signals to users by forming narrow directional beams using a large number of antennas.

In a higher frequency band, in order to compensate a large propagation loss, it is conceivable to use beamforming for the transmission of not only system information and paging information but also all of downlink signals/downlink channels including common pilot signals, reference signals or the like. Similarly, as for uplink, in order to compensate a propagation loss, it is also conceivable to use beamforming for the reception of all uplink signals/uplink channels.

For example, patent literature (JP2014-531852T) discloses an art in which a downlink beam ID and an uplink beam ID are included in a HANDOVER REQUEST message transmitted to a target base station from a source base station of a handover of a terminal apparatus. Further, according to the patent literature, the downlink beam ID is used for designating a downlink beam for transmitting data to the terminal apparatus after the handover, and the uplink beam ID is used for designating an uplink beam for receiving data from the terminal apparatus after the handover. This makes it possible to omit an operation for selecting beams at the time of the handover, leading to a reduction in delay of the handover.

According to the art disclosed in the patent literature, however, a propagation loss is compensated in the transmission/reception of data after the handover, but a propagation loss is not compensated in the transmission/reception of control signals between the terminal apparatus and the target base station in the handover. In particular, it may not be possible for the target base station to receive an access signal (for example, an uplink signal in random access) of the terminal apparatus due to a large propagation loss. This, as a result, leads to a possibility of an increased failure rate of the handover.

Therefore, it is desirable to make it possible to increase a possibility of a success of the handover.

(2) Technical Features

In the example embodiments of the present invention, for example, a first base station (base station located around a terminal apparatus) transmits reference signals using beamforming, and the terminal apparatus performs the measurements of the reference signals. Further, the terminal apparatus transmits first beam related information for the first base station (and measurement results) to a second base station (serving base station of the terminal apparatus). For example, the first beam related information indicates one of a plurality of sets of beamforming weights (for example, a preferred beamforming weight).

Thereafter, a handover of the terminal apparatus from the second base station (source base station) to the first base station (target base station) is performed. In this case, the second base station (source base station) transmits, to the first base station (target base station), a handover message (for example, a HANDOVER REQUEST message) including second beam related information (for example, the same information as the first beam related information) corresponding to the first beam related information.

In particular, in the example embodiments of the present invention, the first base station receives an access signal of the terminal apparatus based on the second beam related information. For example, the first base station receives the access signal using the preferred beamforming weight.

This makes it possible to, for example, compensate a propagation loss of the access signal. Accordingly, it is possible to increase a possibility of a success of the handover.

Note that the above technical features are specific examples of the example embodiments of the present invention, and as a matter of course, the example embodiments of the present invention are not limited to the above technical features.

2. First Example Embodiment

Next, a first example embodiment of the present invention will be described with reference to FIG. 1 to FIG. 11.
<2.1. Configuration of System>
An example of the configuration of a system 1 according to the first example embodiment will be described with reference to FIG. 1. FIG. 1 is an explanatory diagram illustrating an example of the schematic configuration of the system 1 according to the first example embodiment. Referring to FIG. 1, the system 1 includes a base station 100, a base station 200, and a terminal apparatus 300.

For example, the system 1 may be a system conforming to the standard of 3GPP (Third Generation Partnership Project). More specifically, the system 1 may be a system conforming to the standard of the Fifth Generation (5G), for instance.

(1) Base Station 100

The base station 100 performs radio communication with terminal apparatuses located in a cell 10 (or a coverage area 10). In the first example embodiment, the base station 100 uses beamforming for the radio communication.

In particular, in the first example embodiment, the base station 100 transmits reference signals (RS) using the beamforming. The reference signal is a signal for the measurements of received signal strength and/or received quality and corresponds to, for example, CRS (Cell-specific Reference Signal) or CSI-RS (Channel State Information Reference Signal) in LTE (Long Term Evolution). The reference signal may be called CRS or CSI-RS as in LTE, or may be called differently (for example, "an XXX reference signal" (XXX is an arbitrary term), "a pilot signal", or a completely different another signal name). The base station 100 may transmit all kinds of reference signals (for example, CRS, CSI-RS, a UE-specific RS, and/or MBSFN (Multicast/Broadcast over a Signal Frequency Network) RS) using the beamforming. Alternatively, the base station 100 may transmit partial kinds of the reference signals using the beamforming without transmitting the other kinds of reference signals using the beamforming.

The base station 100 may transmit not only data and the reference signals but also other downlink signals/downlink channels (for example, all signals/channels) using the beamforming.

Note that the base station 100 is anode that performs radio communication with the terminal apparatuses, in other words, is a node of RAN (Radio Access Network). For example, the base station 100 may be NodeB, H-NodeB (Home Node B), eNodeB (evolved Node B), or H-eNodeB (Home evolved Node B), or may be gNodeB (generation Node B) in 5G The base station 100 may include a plurality of units (or a plurality of nodes). The plurality of units (or the plurality of nodes) may include a first unit (or a first node) which processes lower protocol layers and a second unit (or a second node) which processes higher protocol layers. As one example, the first unit may be called DU (Distributed Unit) or AU (Access Unit), and the second unit may be called CU (Center/Central Unit). As another example, the first unit may be called RU (Radio Unit) or RU (Remote Unit), and the second unit may be called DU (Digital Unit). The RU may be RRH (Remote Radio Head) or RRU (Remote Radio Unit), and the DU may be BBU (Base Band Unit). As a matter of course, the names of the first unit (or the first node) and the second unit (or the second name) are not limited to these examples. Alternatively, the base station 100 may be a single unit (or a single node). In this case, the base station 100 may be one of the aforesaid plurality of units (for example, one of the first unit and the second unit), or may be connected to another unit out of the plurality of units (for example, the other of the first unit and the second unit).

(2) Base Station 200

The base station 200 performs radio communication with terminal apparatuses located in a cell 20 (or a coverage area 20).

In the first example embodiment, for example, the base station 200 performs radio communication with the terminal apparatuses using beamforming similarly to the base station 100. Alternatively, the base station 200 may perform radio communication with the terminal apparatuses using the beamforming in a manner different from that of the base station 100, or may perform radio communication with the terminal apparatuses not using the beamforming.

Note that the base station 200 is also a node that performs radio communication with the terminal apparatuses, in other words, it is a node of RAN, similarly to the base station 100.

(3) Terminal Apparatus 300

The terminal apparatus 30 performs radio communication with base stations. For example, the terminal apparatus 300 performs radio communication with the base station 100 when located in the cell 10, and performs radio communication with the base station 200 when located in the cell 20.

In particular, in the first example embodiment, a handover of the terminal apparatus 300 from the base station 200 to the base station 100 is performed (due to, for example, the movement of the terminal apparatus 300). In this case, the base station 200 is a source base station of the handover, and the base station 100 is a target base station of the handover.

<2.2. Configuration of Base Station 100>

Figure 2:
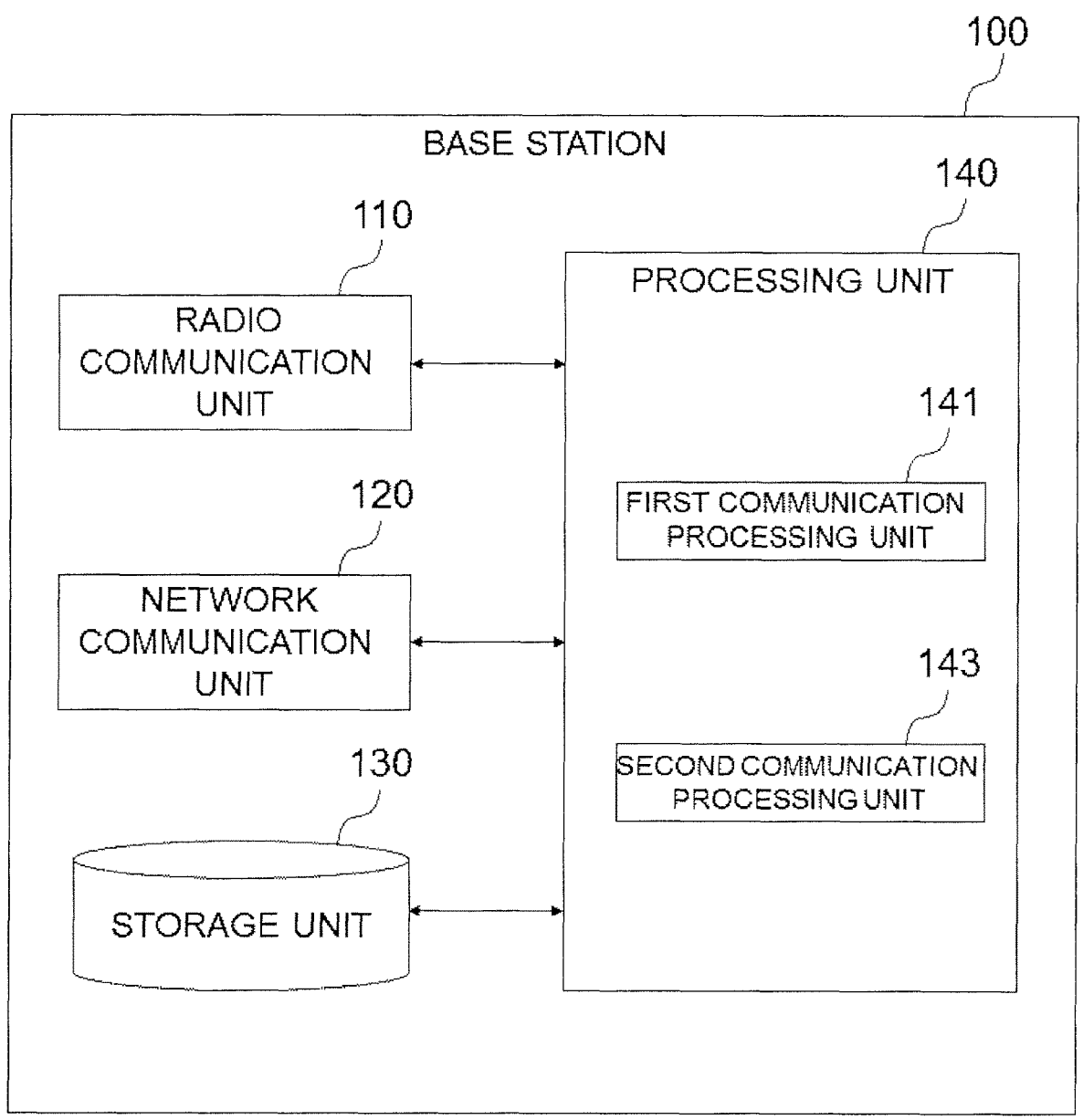
FIG. 2 is a block diagram illustrating an example of the schematic configuration of a first base station according to the first example embodiment.

Next, an example of the configuration of the base station 100 of the first example embodiment will be described with reference to FIG. 2. FIG. 2 is a block diagram illustrating an example of the schematic configuration of the base station 100 of the first example embodiment. Referring to FIG. 2, the base station 100 includes a radio communication unit 110, a network communication unit 120, a storage unit 130, and a processing unit 140.

(1) Radio Communication Unit 110

The radio communication unit 110 wirelessly transmits/receives signals. For example, the radio communication unit 110 receives signals from terminal apparatuses and transmits signals to terminal apparatuses.

(2) Network Communication Unit 120

The network communication unit 120 receives signals from a backhaul and transmits signals to the backhaul.

(3) Storage Unit 130

The storage unit 130 temporarily or permanently stores programs and parameters for the operation of the base station 100 and various data.

(4) Processing Unit 140

The processing unit 140 provides various functions of the base station 100. The processing unit 140 includes a first communication processing unit 141 and a second communication processing unit 143. Note that the processing unit 140 can further include other constituent elements besides these constituent elements. That is, the processing unit 140 can perform operations other than the operations of these constituent elements. Specific operations of the first communication processing unit 141 and the second communication processing unit 143 will be described in detail later.

For example, the processing unit 140 (first communication processing unit 141) communicates with terminal apparatuses (for example, the terminal apparatus 300) via the radio communication unit 110. For example, the processing unit 140 (second communication processing unit 143) communicates with other network nodes (for example, the base station 200) via the network communication unit 120.

(5) Implementation Example

The radio communication unit 110 may be implemented by an antenna, a RF (Radio Frequency) circuit, or the like, and the antenna may be a directional antenna. The network communication processing unit 120 may be implemented by a network adapter, a network interface card, or the like. The storage unit 130 may be implemented by a memory (for example, a nonvolatile memory and/or a volatile memory) and/or a hard disk or the like. The processing unit 140 may be implemented by a BB (Baseband) processor and/or another processor. The first communication processing unit 141 and the second communication processing unit 143 may be implemented by the same processor, or may be implemented separately by different processors. The aforesaid memory (storage unit 130) may be included in such a processor (chip).

The base station 100 may include a memory which stores a program and one or more processors capable of executing the program. The one or more processors may perform the operation of the processing unit 140 (the first communication processing unit 141 and the second communication processing unit 143). The program may be a program for causing the one or more processors to execute the operation of the processing unit 140 (the first communication processing unit 141 and the second communication processing unit 143).

<2.3. Configuration of Base Station 200>

Figure 3:
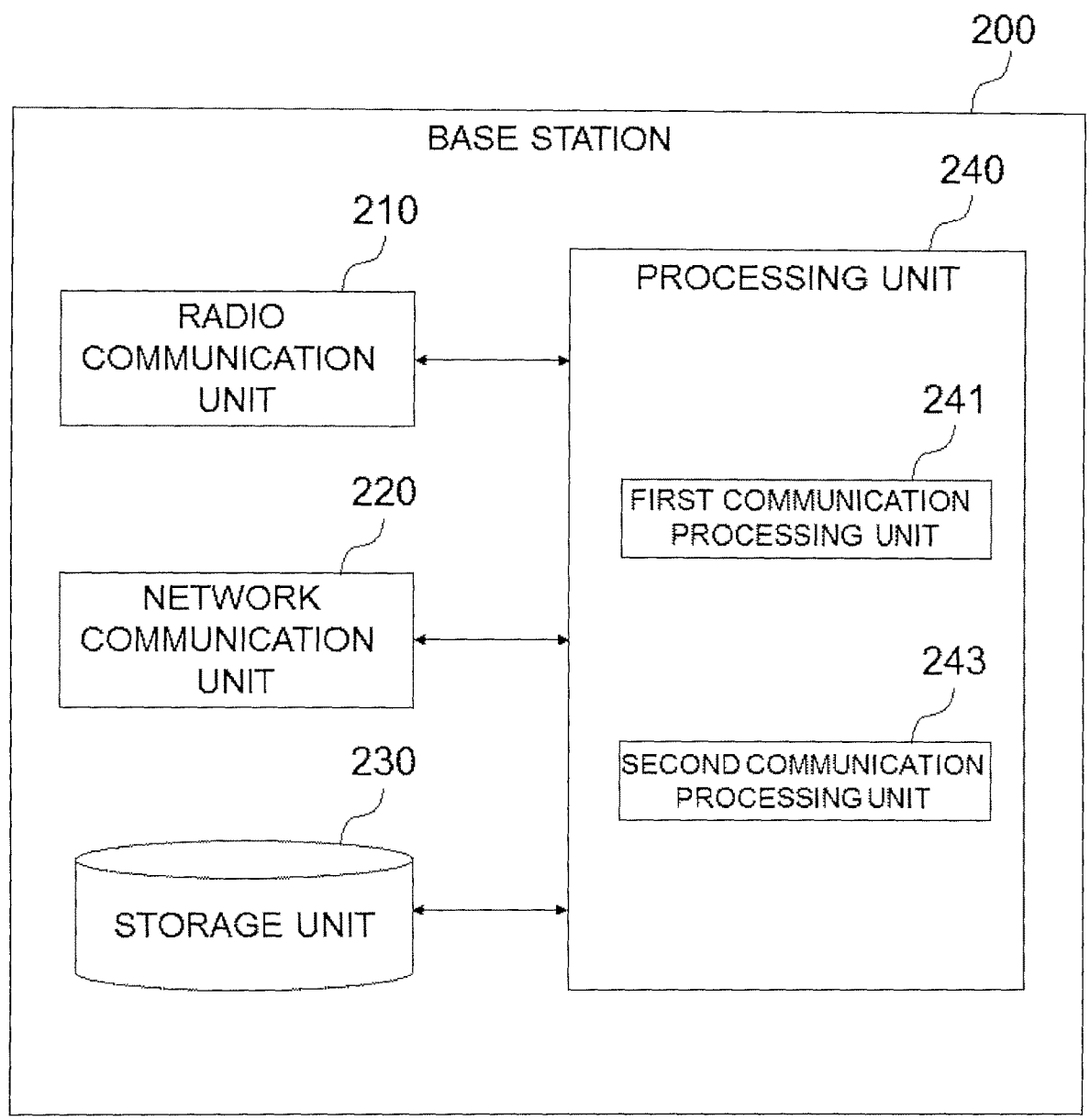
FIG. 3 is a block diagram illustrating an example of the schematic configuration of a second base station of the first example embodiment.

Next, an example of the configuration of the base station 200 of the first example embodiment will be described with reference to FIG. 3. FIG. 3 is a block diagram illustrating an example of the schematic configuration of the base station 200 of the first example embodiment. Referring to FIG. 3, the base station 200 includes a radio communication unit 210, a network communication unit 220, a storage unit 230, and a processing unit 240.

(1) Radio Communication Unit 210

The radio communication unit 210 wirelessly transmits/receives signals. For example, the radio communication unit 210 receives signals from terminal apparatuses and transmits signals to terminal apparatuses.

(2) Network Communication Unit 220

The network communication unit 220 receives signals from a backhaul and transmits signals to the backhaul.

(3) Storage Unit 230

The storage unit 230 temporarily or permanently stores programs and parameters for the operation of the base station 200 and various data.

(4) Processing Unit 240

The processing unit 240 provides various functions of the base station 200. The processing unit 240 includes a first communication processing unit 241 and a second communication processing unit 243. Note that the processing unit 240 can further include other constituent elements besides these constituent elements. That is, the processing unit 240 can perform operations other than the operations of these constituent elements. Specific operations of the first communication processing unit 241 and the second communication processing unit 243 will be described in detail later.

For example, the processing unit 240 (first communication processing unit 241) communicates with terminal apparatuses (for example, the terminal apparatus 300) via the radio communication unit 210. For example, the processing unit 240 (second communication processing unit 243) communicates with other network nodes (for example, the base station 100) via the network communication unit 220.

(5) Implementation Example

The radio communication unit 210 may be implemented by an antenna, a radio frequency (RF) circuit, or the like, and the antenna may be a directional antenna. The network communication unit 220 may be implemented by a network adapter, a network interface card, or the like. The storage unit 230 may be implemented by a memory (for example, a nonvolatile memory and/or a volatile memory) and/or a hard disk or the like. The processing unit 240 may be implemented by a baseband (BB) processor and/or another processor. The first communication processing unit 241 and the second communication processing unit 243 may be implemented by the same processor, or may be implemented separately by different processors. The aforesaid memory (storage unit 230) may be included in such a processor (chip).

The base station 200 may include a memory which stores a program and one or more processors capable of executing the program. The one or more processors may perform the operation of the processing unit 240 (the first communication processing unit 241 and the second communication processing unit 243). The program may be a program for causing the one or more processors to execute the operation of the processing unit 240 (the first communication processing unit 241 and the second communication processing unit 243).

<2.4. Configuration of Terminal Apparatus 300>

Figure 4:
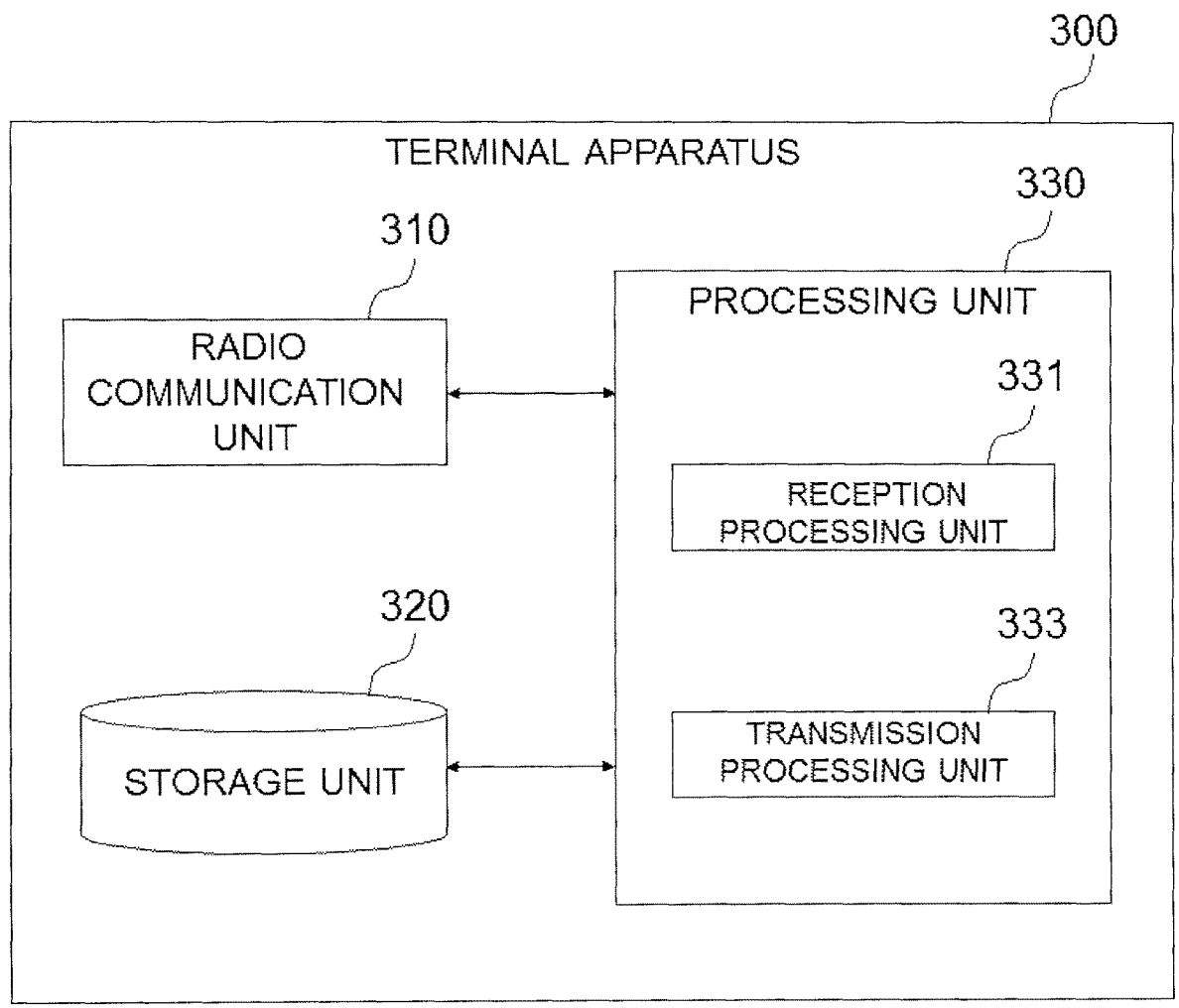
FIG. 4 is a block diagram illustrating an example of the schematic configuration of a terminal apparatus of the first example embodiment.

Next, an example of the configuration of the terminal apparatus 300 of the first example embodiment will be described with reference to FIG. 4. FIG. 4 is a block diagram illustrating an example of the schematic configuration of the terminal apparatus 300 of the first example embodiment. Referring to FIG. 4, the terminal apparatus 300 includes a radio communication unit 310, a storage unit 320, and a processing unit 330.

(1) Radio Communication Unit 310

The radio communication unit 310 wirelessly transmits/receives signals. For example, the radio communication unit 310 receives signals from base stations and transmits signals to base stations.

(2) Storage Unit 320

The storage unit 320 temporarily or permanently stores programs and parameters for the operation of the terminal apparatus 300 and various data.

(3) Processing Unit 330

The processing unit 330 provides various functions of the terminal apparatus 300. The processing unit 330 includes a reception processing unit 331 and a transmission processing unit 333. Note that the processing unit 330 can further include other constituent elements besides these constituent elements. That is, the processing unit 330 can perform operations other than the operations of these constituent elements. Specific operations of the reception processing unit 331 and the transmission processing unit 333 will be described in detail later.

For example, the processing unit 330 communicates with base stations (for example, the base station 100 and/or the base station 200) via the radio communication unit 310.

(4) Implementation Example

The radio communication unit 310 may be implemented by an antenna, a radio frequency (RF) circuit, or the like. The storage unit 320 may be implemented by a memory (for example, a nonvolatile memory and/or a volatile memory) and/or a hard disk or the like. The processing unit 330 may be implemented by a baseband (BB) processor and/or another processor. The reception processing unit 331 and the transmission processing unit 333 may be implemented by the same processor, or may be implemented separately by different processors. The aforesaid memory (storage unit 320) may be included in such a processor (chip).

The terminal apparatus 300 may include a memory which stores a program and one or more processors capable of executing the program. The one or more processors may perform the operation of the processing unit 330 (reception processing unit 331 and transmission processing unit 333). The program may be a program for causing the one or more processors to execute the operation of the processing unit 330 (reception processing unit 331 and transmission processing unit 333).

<2.5. Technical Features>

Next, technical features of the first example embodiment will be described with reference to FIG. 5 to FIG. 8.

In the first example embodiment, the base station 100 (first communication processing unit 141) transmits reference signals using beamforming. The terminal apparatus 300 (reception processing unit 331) receives the reference signals. For example, the base station 100 is a base station located around the terminal apparatus 300, and a serving base station for the terminal apparatus 300 is the base station 200.

Further, the terminal apparatus 300 (transmission processing unit 333) transmits, to the base station 200, first beam related information related to a beam, the first beam related information being information for the base station 100, and the base station 200 (first communication processing unit 241) receives the first beam related information from the terminal apparatus 300.

Further, a handover of the terminal apparatus 300 from the base station 200 (source base station) to the base station 10 (target) is performed. The base station 200 (second communication processing unit 243) transmits, to the base station 100, a handover message (for example, a HANDOVER REQUEST message) including second beam related information corresponding to the first beam related information, and the base station 100 (second communication processing unit 143) receives the handover message from the base station 200.

In particular, in the first example embodiment, the base station 100 (first communication processing unit 141) receives an access signal of the terminal apparatus 300 based on the second beam related information.

(1) Transmission of Reference Signals

Plurality of Beams

For example, the base station 100 (first communication processing unit 141) transmits the reference signals by a plurality of beams. The plurality of beams can be said as beams by which the base station 100 transmits signals (or beams formed by the base station 100 to transmit signals). The beams are beams directed in different directions. The beam here means a directional beam, and for example, is formed by multiplying a signal by a set of beamforming weights and transmitting the signal resulting from the multiplication, using the directional antenna. Hereinafter, specific examples of the plurality of beams will be described with reference to FIG. 5.

Figure 5:
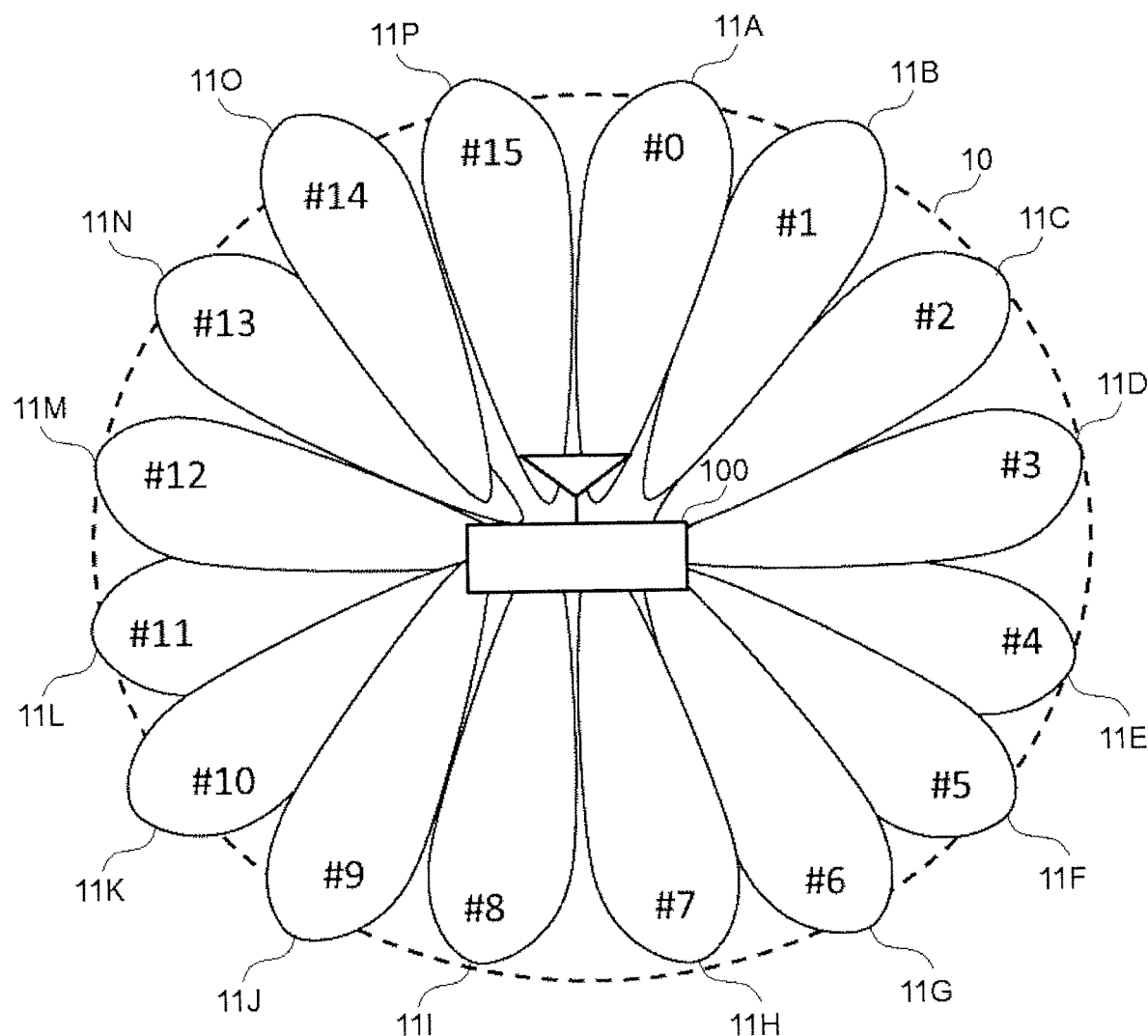
FIG. 5 is an explanatory diagram for explaining an example of a plurality of beams by which reference signals are transmitted.

FIG. 5 is an explanatory diagram for explaining an example of the plurality of beams by which the reference signals are transmitted. Referring to FIG. 5, the base station 100, the cell 10, and sixteen beams 11 (beams 11A to 11P) are illustrated. For example, the base station 100 transmits the reference signals by the sixteen beams 11 in this manner. As one example, the beams are each identified by abeam index (or a weight index). For example, the beam 11A is identified by an index #0, and the beam 11J is identified by an index #9.

Radio Resource

For example, the base station 100 (first communication processing unit 141) transmits the reference signals by the plurality of beams, using radio resources which are different for the respective beams.

As a first example, the radio resource is a time resource. That is, the base station 100 transmits the reference signals by the plurality of beams, using the time resources which are different for the respective beams.

Figure 6:
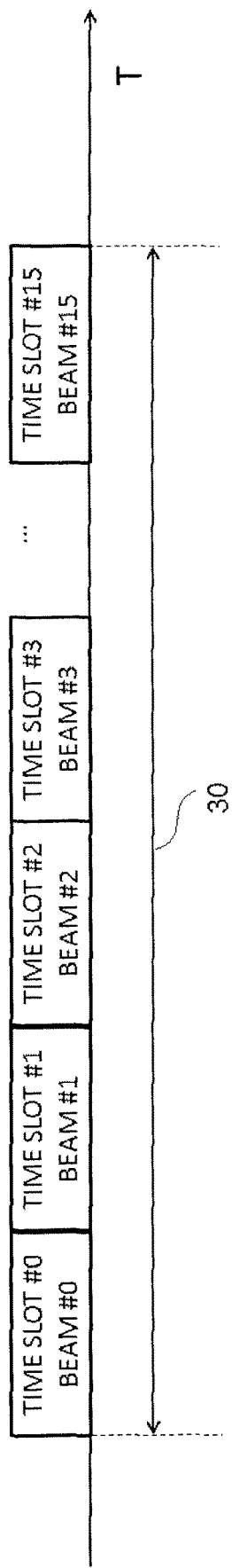
FIG. 6 is an explanatory diagram for explaining an example of radio resources (time resources) to be used for transmitting the reference signals.

FIG. 6 is an explanatory diagram for explaining an example of the radio resources (time resources) used for the transmission of the reference signals. Referring to FIG. 6, sixteen time slots (time slots #0 to #15) which are in a row in a time direction are illustrated. In this example, in a beam search period 30 including the sixteen time slots, the reference signals are transmitted by the sixteen beams. For example, in the time slot #0, the reference signals are transmitted by the beam #0 (beam 11A), and in the time slot #1, the reference signals are transmitted by the beam #1 (beam 11B). Similarly, in the time slot #9, the reference signals are transmitted by the beam #9 (beam 11J). In this example, the time slots in which the reference signals are transmitted by the beams are continuous, but the time slots need not be continuous and may be discrete. Note that the time slot here may be called a subframe, or may be called simply a slot.

As a second example, the radio resource may be a frequency resource. That is, the base station 100 may transmit the reference signals by the plurality of beams, using the frequency resources which are different for the respective beams. For example, the base station 100 may transmit the reference signals by the beam #0 (beam 11A) in a first band (for example, a band having a width of one resource block or more) in a frequency band, and transmit the reference signals by the beam #1 (beam 11B) in a second band of this frequency band. Alternatively, the base station 100 may transmit the reference signals by the beam #0 (beam 11A) using a first carrier (for example, one subcarrier or more) in a block band (for example, a band with a resource block width) included in the frequency band, and transmit the reference signals by the beam #1 (beam 11B) using a second carrier in this block band.

As a third example, the radio resource may be a time-frequency resource. That is, the base station 100 may transmit the reference signals by the plurality of beams using the time-frequency resources which are different for the respective beams. For example, the base station 100 may transmit the reference signals by the beam #0 (beam IA) using a first time-frequency resource (for example, one resource element or more), and transmit the reference signals by the beam #1 (beam 11B) using a second time-frequency resource.

Consequently, even when the base station 100 transmits reference signals common to the beams, it is possible for the terminal apparatus to identify a beam used for the transmission of the reference signals.

A relation between the beams and the radio resources may be statically determined (for example, in a standard), or may be configured by an operator or a network.

Note that the base station 100 (first communication processing unit 141) may transmit reference signals which are different for the respective beams, instead of using the radio resources which are different for the respective beams. This enables the terminal apparatus to identify a beam used for the transmission of a reference signal.

(2) Measurement Report

For example, the terminal apparatus 300 (reception processing unit 331) performs the measurements of the reference signals transmitted by the base station 100 using the beamforming.

For example, the terminal apparatus 300 (transmission processing unit 333) transmits a measurement report to the base station 200. The measurement report includes measurement results of the reference signals which are transmitted by the base station 100 using the beamforming. In particular, the measurement report further includes the aforesaid first beam related information.

More specifically, for example, the terminal apparatus 300 performs the measurements of the reference signals transmitted by each of the beams, to select a beam accompanied by the best measurement results (for example, the highest received power or received quality). In other words, the terminal apparatus 300 selects a preferred beamforming weight. Then, the terminal apparatus 300 transmits, to the base station 200, the measurement report including the first beam related information associated with the selected beam and the best measurement results.

Figure 7:
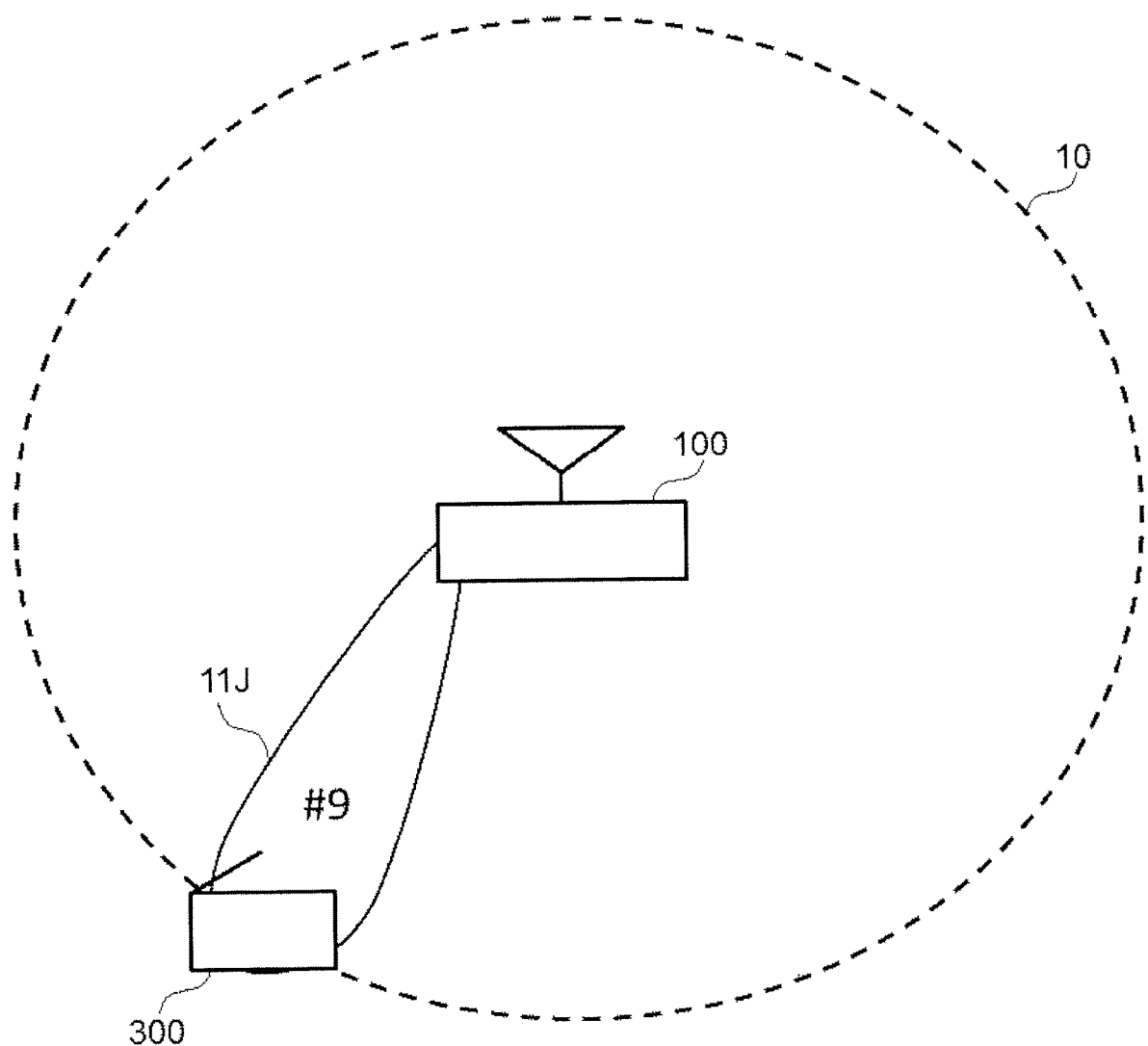
FIG. 7 is an explanatory diagram for explaining an example of a measurement report of the terminal apparatus.

FIG. 7 is an explanatory diagram for explaining an example of the measurement report of the terminal apparatus 300. Referring to FIG. 7, the base station 100 and the terminal apparatus 300 are illustrated. For example, the terminal apparatus 300 performs the measurements of the reference signals transmitted by the beams, to select the beam #9 (beam 11J) accompanied by the best measurement results. Then, the terminal apparatus 300 transmits, to the base station 200, the measurement report including the first beam related information related to the beam #9 (beam 11J) (for example, the beam index/weight index #9) and the best measurement results.

Consequently, for example, it is possible for the base station 200 to obtain the first beam related information for the base station 100 through the measurement report.

(3) Handover Message

As described above, the base station 200 (source base station) transmits, to the base station 100 (target base station), the handover message including the second beam related information. The handover message may be transmitted from the base station 200 directly to the base station 100 (for example, in a case of an X2 handover), or may be transmitted from the base station 200 to the base station 100 via a core network (for example, in a case of an S handover).

For example, the handover message is a HANDOVER REQUEST message. Hereinafter, an example of the first example embodiment will be described, assuming that the handover message is the HANDOVER REQUEST message. However, the handover message used in the first example embodiment is not limited to the HANDOVER REQUEST message, but may be another message transmitted from the source base station to the target base station in the handover procedure.

(4) Beam Related Information

Relation of the First Beam Related Information and the Second Beam Related Information As described above, the second beam related information corresponds to the first beam related information.

For example, the second beam related information is the same information as the first beam related information. That is, the base station 200 includes, in the HANDOVER REQUEST message, the second beam related information which is the same as the first beam related information received from the terminal apparatus 300 and transmits the HANDOVER REQUEST message to the base station 100.

Alternatively, the second beam related information may be information different from the first beam related information. For example, the base station 20 may convert the first beam related information to the second beam related information to transmit, to the base station 100, the HANDOVER REQUEST message including this second beam related information.

Examples of the Beam Related Information

The beam related information (the first beam related information and the second beam related information) is information related to a beam. Since the beam is formed using the beamforming weights (set(s) of the beamforming weights), the beams can have a one-to-one correspondence with the set(s) of the beamforming weights. Therefore, the beam related information can also be said as information related to the beamforming weight (for example, weight related information).

The beam related information is information for the base station 100. For example, the beam related information is information related to a beam of the base station 100 (beam to be used by the base station 100 to transmit a signal).

For example, the beam related information is information related to one of the plurality of beams. Specifically, for example, the beam related information is information indicating one of the plurality of beams, in other words, is information enabling the identification of one of the plurality of beams (for example, beam identification information). As one example, the beam related information is a beam index. Alternatively, the beam related information may be information indicating one of the plurality of set(s) of the beamforming weights, in other words, may be information enabling the identification of one of the plurality of sets (for example, weight identification information). As one example, the beam related information may be a weight index. Since the beam is formed using the set(s) of the beamforming weights, the beams can have a one-to-one correspondence with the set(s) of the beamforming weights. Therefore, the beam related information may be information indicating one of the plurality of beams (beam index), and may be the aforesaid information indicating one of the plurality of sets (weight index). That is, the beam index and the weight index, though named differently, may be the same index. As a matter of course, the beam related information may be information with another name (beam ID, weight ID, beamforming index, beamforming ID, or the like) enabling the identification of the beam or the set of the beamforming weights.

(5) Reception of Access Signal

In particular, in the first example embodiment, the base station 100 (first communication processing unit 141) receives the access signal of the terminal apparatus 300 based on the second beam related information.

For example, the base station 100 (first communication processing unit 141) receives the access signal, using the set of the beamforming weights corresponding to the second beam related information. Specifically, for example, the second beam related information is the beam index or the weight index, and the base station 100 identifies the set of the beamforming weights from the beam index or the weight index. Then, the base station 100 receives the access signal, using this set of the beamforming weights. That is, the base station 100 performs uplink beamforming processing by multiplying the access signal by the aforesaid set of the beamforming weights.

The access signal may be an uplink signal to be used in initial access for transiting from an idle state (for example, RRC_Idle) to an active state or a connected state (for example, RRC_Connected), or to be used in access to a target cell at the time of the execution of the handover. Alternatively, the access signal may be an uplink signal in the re-establishment of radio connection (RRC Connection Re-establishment) for the recovery of the radio connection. The uplink signal may be a random access signal (for example, a random access preamble signal), a control signal transmitted on an uplink data channel (for example, PUSCH (Physical Uplink Shared Channel)), or a control signal transmitted on an uplink control channel (for example, PUCCH (Physical Uplink Control Channel)). In the system 1 of the first example embodiment, unlike the art disclosed in patent literature (JP2014-531852T), the terminal apparatus 300 does not communicate with the base station 100 in advance (by ranging and a response thereto), but starts the communication with the base station 100 using the access signal. Therefore, a success in receiving the access signal is very important.

Thus receiving the access signal using the second beam related information ensures, for example, the compensation of a propagation loss of the signal, resulting in an increased possibility of the success of receiving the access signal. This can further increase the possibility of the success of the handover.

Note that, for example, a set of beamforming weights for uplink is the same as a set of beamforming weights for downlink. Alternatively, the set of the beamforming weights for uplink may be different from the set of the beamforming weights for downlink.

(6) Flow of Processing

Figure 8:
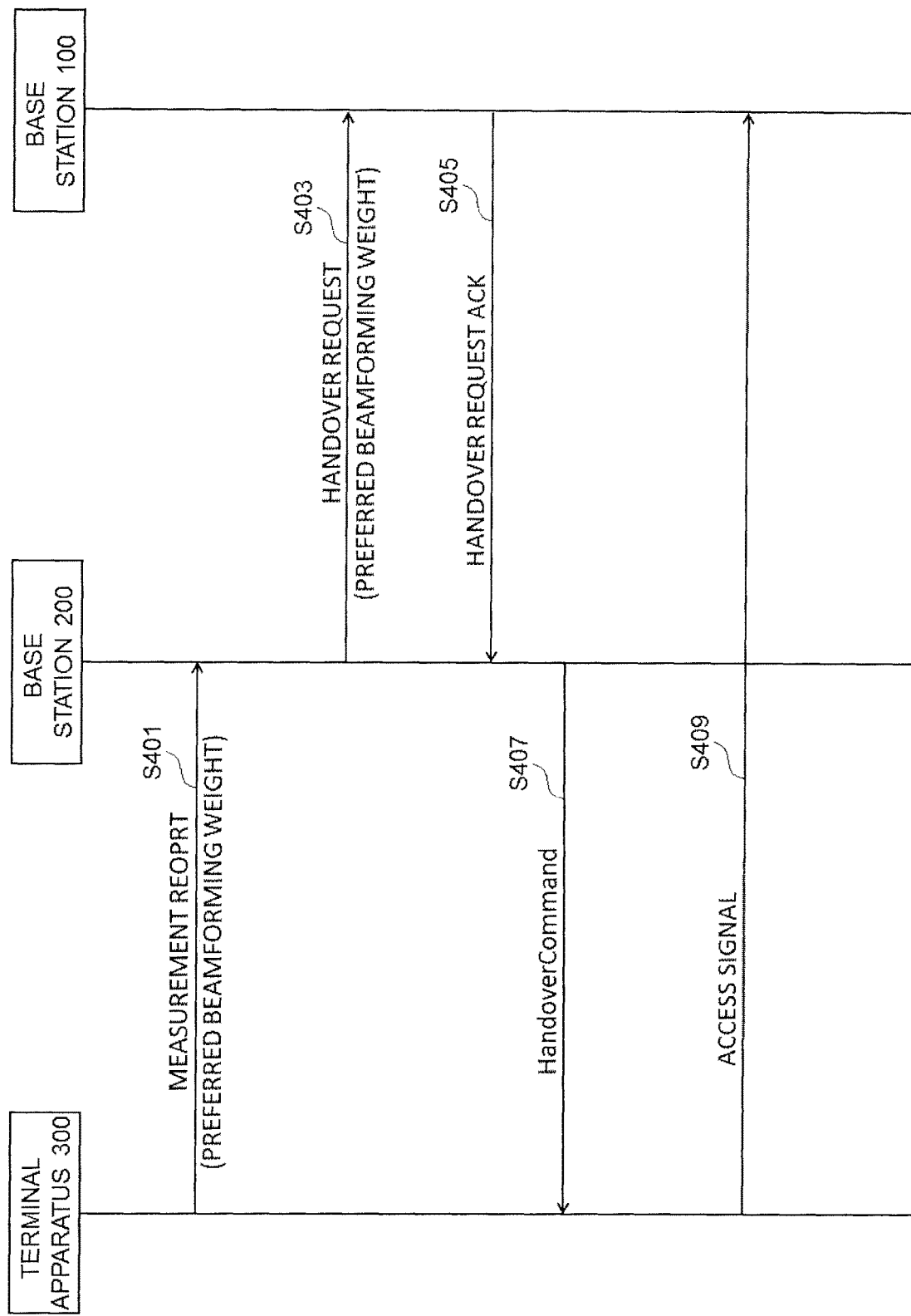
FIG. 8 is a sequence diagram for explaining an example of a schematic flow of processing according to the first example embodiment.

An example of processing according to the first example embodiment will be described with reference to FIG. 8. FIG. 8 is a sequence diagram for explaining an example of a schematic flow of the processing according to the first example embodiment.

The terminal apparatus 300 performs the measurements of reference signals transmitted by the base station 100 using beamforming, to select a preferred beamforming weight. Then, the terminal apparatus 300 transmits, to the base station 200 (serving base station), a measurement report including a weight index indicating the preferred beamforming weight (S401). The measurement report includes measurement results of the reference signals.

Thereafter, a handover of the terminal apparatus 300 from the base station 200 (source base station) to the base station 100 (target base station) is decided, and the base station 200 transmits, to the base station 100, a HANDOVER REQUEST message including the weight index indicating the preferred beamforming weight (S403).

The base station 100 obtains the weight index included in the HANDOVER REQUEST message and transmits, to the base station 200, a HANDOVER REQUEST ACKNOWLEDGE message including a HandoverCommand message of an RRC layer corresponding to an instruction of the handover (S405).

The base station 200 transmits, to the terminal apparatus 300, an RRC signal (for example, an RRCConnectionReconfiguration message) including the HandoverCommand message (S407).

The terminal apparatus 300 transmits an access signal to the base station 100 (S409). The base station 100 receives the access signal based on the weight index. That is, the base station 100 receives the access signal, using the beamforming weight indicated by the weight index.

Note that the example of the flow of the processing described above is only schematic, and as a matter of course, transmission/reception other than those at Steps S401 to S409 described above can be performed in the first example embodiment.

(7) Meaning of "Transmit"

"Transmit" here means, for example, that transmission processing in at least one protocol layer out of a plurality of protocol layers is performed, and does not mean that a signal is output by wire or by radio. Similarly, "receive" here means, for example, that reception processing in at least one protocol layer out of a plurality of protocol layers is performed. As one example, the plurality of protocol layers includes a physical layer, a MAC (Media Access Control) layer, a RLC (Radio Link Control) layer, a PDCP (Packet Data Convergence Protocol) layer, and a RRCS (Radio Resource Control) layer. As another example, the plurality of protocol layers includes a physical layer, a MAC layer, an IP (Internet Protocol) layer, and a transport layer.

Further, "transmit X to Y" here is not limited to the transmission of X directly to Y but includes the transmission of X indirectly to Y (that is, X is transmitted to another node and X is transmitted to Y through a transfer by the other node). Similarly, "receive X from Y" here is not limited to the reception of X directly from Y, but includes the reception of X indirectly from Y (that is, X transmitted by Y is received through the transfer by another node).

<2.6. Example Alterations>

Next, example alterations of the first example embodiment will be described with reference to FIG. 9 to FIG. 11.

(1) First Example Alteration

Resource Information

In a first example alteration of the first example embodiment, for example, the base station 100 (second communication processing unit 143) transmits, to the base station 200, resource information indicating a radio resource for transmitting the access signal, and the base station 200 (second communication processing unit 243) receives the resource information.

Then, the base station 200 (first communication processing unit 241) transmits the resource information to the terminal apparatus 300 and the terminal apparatus 300 (reception processing unit 331) receives the resource information.

Thereafter, the terminal apparatus 3 (transmission processing unit 333) transmits the access signal to the base station 100 based on the resource information. That is, the terminal apparatus 300 (transmission processing unit 333) transmits the access signal to the base station 100, using the radio resource indicated by the resource information. The base station 100 receives (based on the aforesaid second beam related information) the access signal which is transmitted using the radio resource.

Consequently, for example, it is possible for the base station 100 to more easily receive the access signal of the terminal apparatus 300.

The resource information may be called a Dedicated RACH (Random Access Channel) Resource Information.

Radio Resource

For example, the aforesaid radio resource is a radio resource for a beam or a set of beamforming weights corresponding to the second beam related information.

More specifically, for example, access radio resources are prepared for the respective beams or the respective set(s) of the beamforming weights. For example, the second beam related information indicates a beam or a set of beamforming weights, and the radio resource indicated by the resource information is a radio resource for this beam or this set of the beamforming weights.

Figure 9:
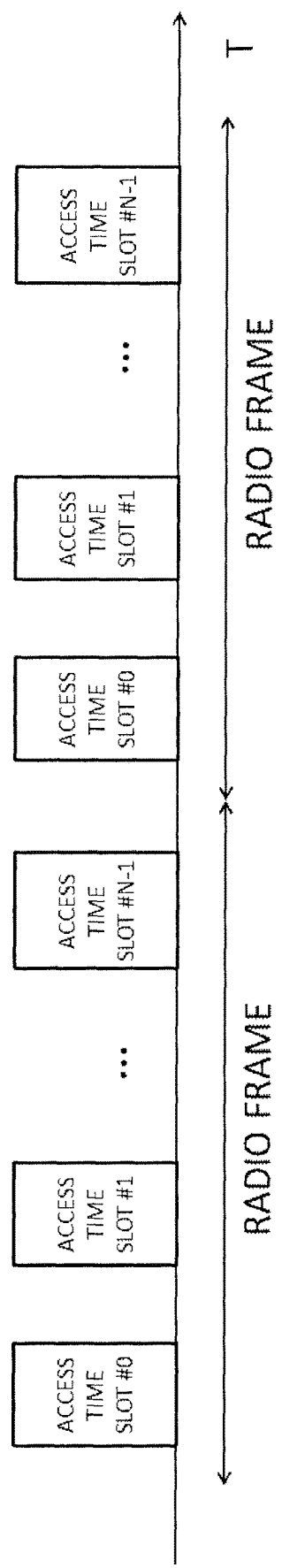
FIG. 9 is an explanatory diagram for explaining an example of radio resources indicated by resource information.

FIG. 9 is an explanatory diagram for explaining an example of the radio resources indicated by the resource information. Referring to FIG. 9, N time slots included in each radio frame are illustrated. In this example, access radio resources are prepared in the respective time slots. For example, the time slot #0 is an access radio resource of the beam #0. In this case, in the time slot #0, the base station 100 receives the access signal using a set of beamforming weights identified by the beam index (or the weight index) #0. For example, the time slot #N−1 is an access radio resource of the beam #15. In this case, in the time slot #N−1, the base station 100 receives the access signal using a set of beamforming weights identified by the beam index (or weight index) #15.

Consequently, for example, it is possible for the base station 100 to further easily receive the access signal of the terminal apparatus 300. This is because, when receiving the access signal, the base station 100 need not use various sets of beamforming weights but only need to use a specific set of beamforming weights.

Retransmission Cycle Information

For example, the base station 100 (second communication processing unit 143) transmits, to the base station 200, retransmission cycle information indicating a retransmission cycle of the access signal, with the resource information, and the base station 200 (second communication processing unit 243) receives the retransmission cycle information.

Then, the base station 200 (first communication processing unit 241) transmits the retransmission cycle information to the terminal apparatus 300, and the terminal apparatus 300 (reception processing unit 331) receives the retransmission cycle information.

Thereafter, the terminal apparatus 300 (transmission processing unit 333) retransmits the access signal to the base station 100 based on the retransmission cycle information. That is, the terminal apparatus 300 (transmission processing unit 333) retransmits the access signal to the base station 100 with a retransmission cycle indicated by the retransmission cycle information.

Consequently, for example, it is possible for the base station 100 to more easily receive the retransmitted access signal as well.

The retransmission cycle information may be called RACH (Random Access Channel) Retransmission cycle Information.

Message

For example, the base station 1 (second communication processing unit 143) transmits, to the base station 200, a response message to the aforesaid HANDOVER REQUEST message, and the base station 200 (second communication processing unit 243) receives the response message. The response message may be transmitted from the base station 100 directly to the base station 200 (for example, in a case of an X2 handover), or may be transmitted from the base station 100 to the base station 200 via a core network (for example, in a case of an Si handover). In particular, the response message includes the resource information and the retransmission cycle information. Specifically, for example, the response message is a HANDOVER REQUEST ACKNOWLEDGE message. Further, for example, the HANDOVER REQUEST ACKNOWLEDGE message includes an RRC Container, and the RRC Container includes a HandoverCommand message. Further, for example, the HandoverCommand message includes an RRCConnectionReconfiguration message, and the RRCConnectionReconfiguration message includes the resource information and the retransmission cycle information. As a matter of course, the first example embodiment is not limited to this example, and the response message may include the resource information and the retransmission cycle information in a different manner.

For example, the base station 200 (first communication processing unit 241) transmits (transfers), to the terminal apparatus 300, the HandoverCommand message (included in the response message), and the terminal apparatus 300 (reception processing unit 331) receives the HandoverCommand message. As described above, the HandoverCommand message includes the resource information and the retransmission cycle information.

Flow of Processing

Figure 10:
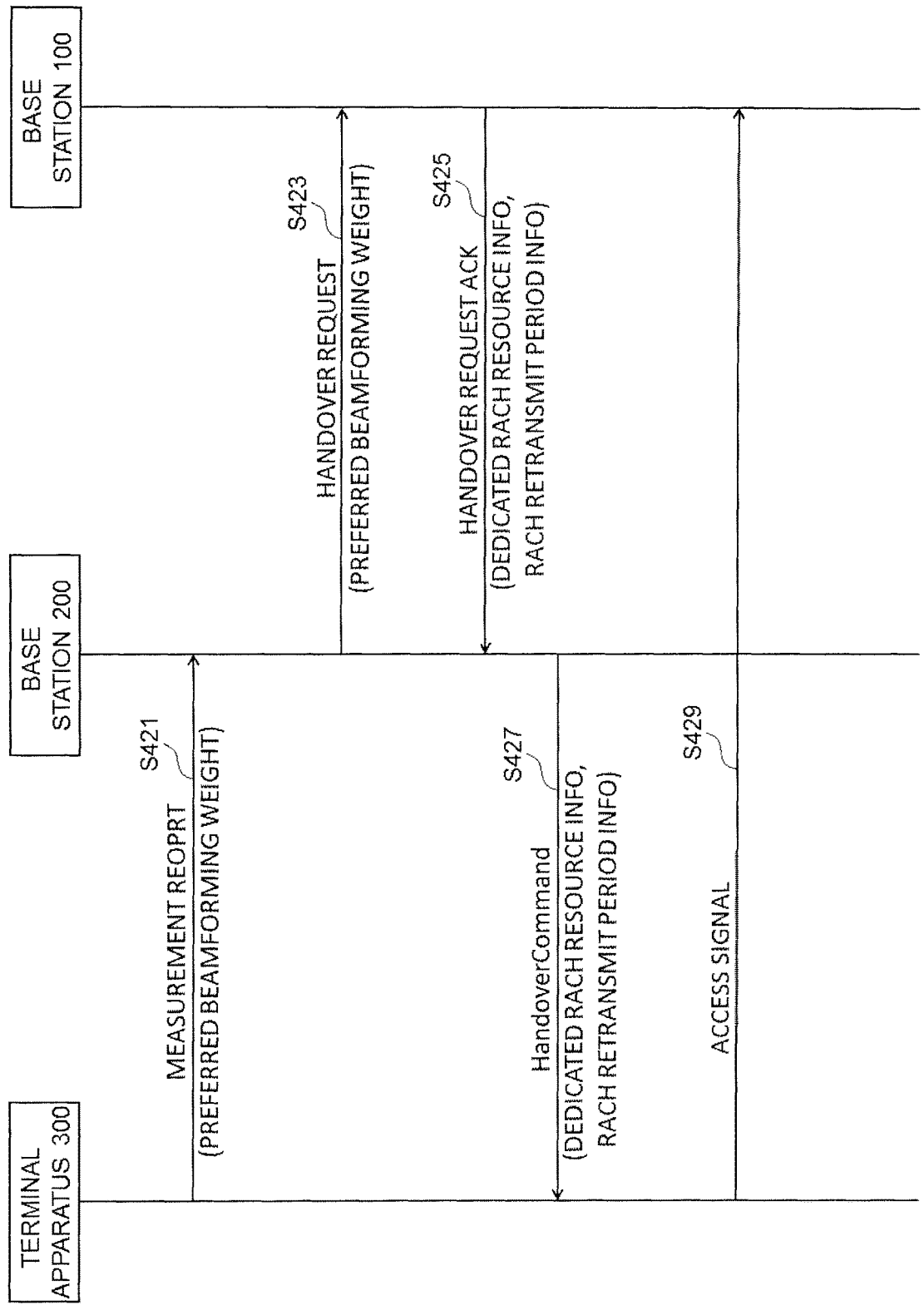
FIG. 10 is a sequence diagram for explaining an example of a schematic flow of processing of a first example alteration of the first example embodiment.

FIG. 10 is a sequence diagram for explaining an example of a schematic flow of processing of the first example alteration of the first example embodiment. Descriptions of Steps S421, S423 illustrated in FIG. 10 are the same as the descriptions of, for example, Steps S401, S403 illustrated in FIG. 8. Therefore, overlapping descriptions will be omitted here, and only Steps S425, S427, S429 will be described.

The base station 100 obtains a weight index included in a HANDOVER REQUEST message. Then, the base station 100 generates Dedicated RACH Resource Information indicating a radio resource for a set of beamforming weights indicated by the weight index. Thereafter, the base station 100 transmits, to the base station 200, a HandoverCommand message including the Dedicated RACH Resource Information, in a HANDOVER REQUEST ACKNOWLEDGE message (S425). The HandoverCommand message may further include RACH Retransmission cycle Information.

The base station 200 transfers the HandoverCommand message to the terminal apparatus 300 (S427).

The terminal apparatus 300 transmits an access signal to the base station 100, using a radio resource indicated by the Dedicated RACH Resource Information (S429). Based on the weight index, the base station 100 receives the access signal transmitted using the radio resource. That is, the base station 100 receives the access signal transmitted using the radio resource (radio resource for the set of the beamforming weights), using the set of the beamforming weights indicated by the weight index. Incidentally, if retransmission is necessary, the terminal apparatus 300 retransmits the access signal to the base station 100, with a retransmission cycle indicated by the Dedicated RACH Retransmission cycle Information.

Note that the example of the flow of the processing described above is only schematic, and as a matter of course, in the first example alteration of the first example embodiment, transmission/reception other than those at Steps S421 to S429 described above can be performed.

Alternate Method

In the above-described example, the base station 100 transmits, to the base station 200, the resource information indicating the radio resource for transmitting the access signal, and the base station 200 receives the resource information, but the first example alteration is not limited to this example.

Instead of that the base station 100 transmits the resource information to the base station 200, the base station 200 (first communication processing unit 241) may generate the resource information. In this case, the base station 200 may receive, from the base station 100 information necessary for generating the resource information (for example, information indicating a radio resource for each beam), in advance.

Consequently, for example, it is possible to reduce a volume of information transmitted/received between the base station 100 and the base station 200.

(2) Second Example Alteration

In a second example alteration of the first example embodiment, for example, the base station 100 (second communication processing unit 143) transmits, to the base station 200, beamforming configuration information related to a configuration of beamforming of the base station 100. Then, the base station 200 (second communication processing unit 243) receives the beamforming configuration information.

Further, the base station 200 (first communication processing unit 241) transmits the beamforming configuration information to the terminal apparatus 300, and the terminal apparatus (reception processing unit 331) receives the beamforming configuration information.

Then, based on the beamforming configuration information, the terminal apparatus 300 (reception processing unit 331) receives reference signals transmitted by the base station 100 using the beamforming. For example, the terminal apparatus 300 (reception processing unit 331) performs the measurements of the reference signals based on the beamforming configuration information.

Consequently, for example, it is possible to use a configuration of beamforming suitable for the base station or the cell, and it is possible for the terminal apparatus 3 to perform the reception/measurements according to the configuration.

Configuration Information

For example, the beamforming configuration information includes beam number information indicating the number of beams. In the example in FIG. 5, the beam number information indicates 16 as the number of the beams. Consequently, it is possible to use beams in number according to properties (for example, size) of the cell.

For example, the beamforming configuration information includes beam resource information indicating radio resources for respective beams for transmitting the reference signals. For example, as described with reference to FIG. 6, the radio resource is the time resource for each beam. In this case, for example, the beam resource information includes a period and an offset in a time direction. Alternatively, the radio resource may be the frequency resource for each beam. In this case, the beam resource information may include a period and an offset in a frequency direction. Alternatively, the radio resource may be the time-frequency resource for each beam. In this case, the beam resource information may be information indicating a pattern of the radio resource. This makes it possible to, for example, more flexibly set a radio resource to be used for the transmission of the reference signals using the beamforming.

Message

For example, the base station 100 (second communication processing unit 143) transmits, to the base station 200, the beam forming configuration information at the time of the setup of an interface between the base station 10 and the base station 200. Then, the base station 200 (second communication processing unit 243) receives the beamforming configuration information.

Specifically, for example, the base station 100 (second communication processing unit 143) transmits, to the base station 200, an X2 SETUP REQUEST message or an X2 SETUP RESPONSE message. Then, the base station 200 (second communication processing unit 243) receives the X2 SETUP REQUEST message or the X2 SETUP RESPONSE message. In particular, the X2 SETUP REQUEST message or the X2 SETUP RESPONSE message includes the beamforming configuration information.

For example, the base station 200 (first communication processing unit 241) transmits a measurement configuration to the terminal apparatus 300, and the terminal apparatus 300 (reception processing unit 331) receives the measurement configuration. In particular, the measurement configuration includes the beamforming configuration information.

Flow of Processing

Figure 11:
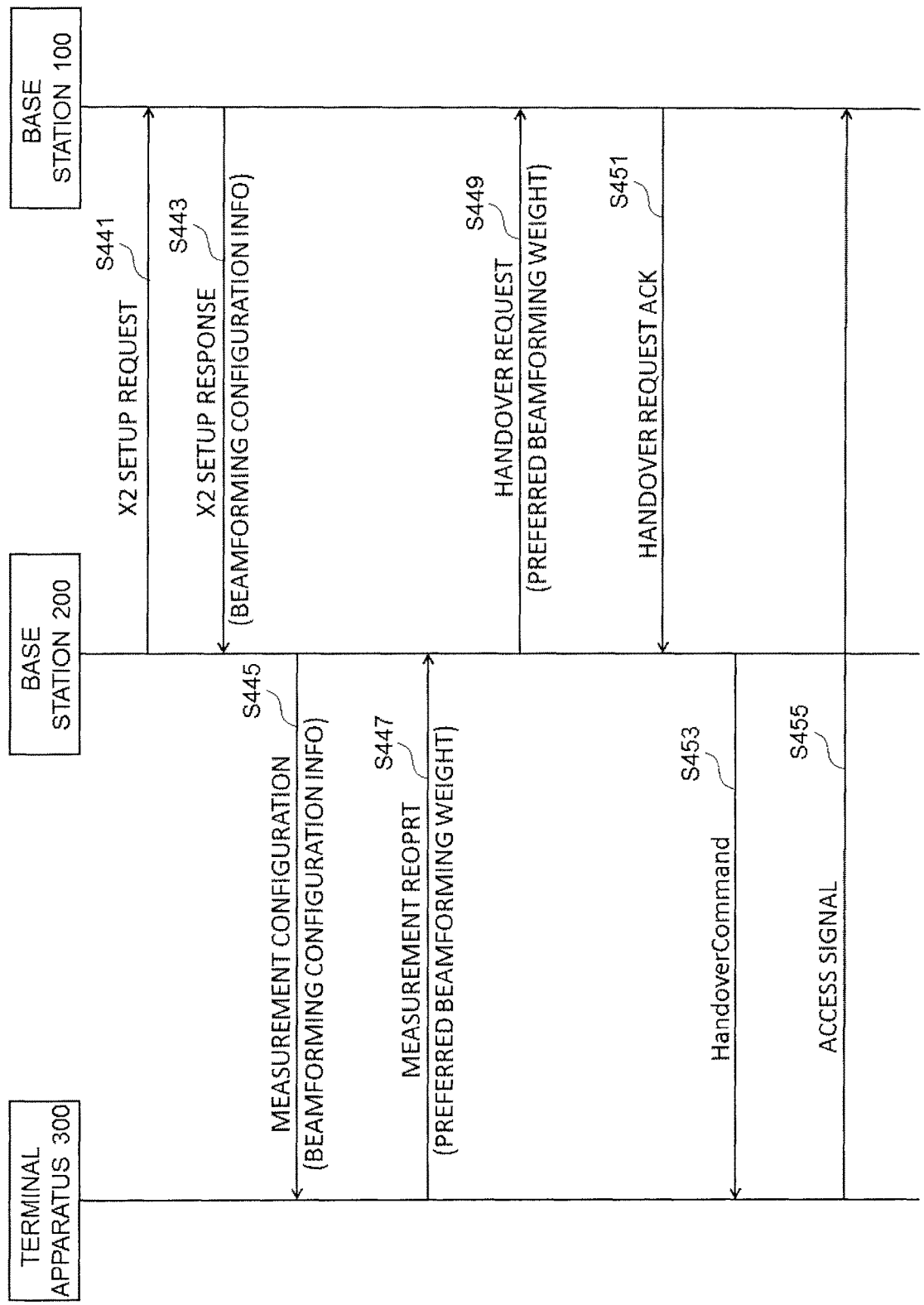
FIG. 11 is a sequence diagram for explaining a schematic flow of processing of a second example alteration of the first example embodiment.

FIG. 11 is a sequence diagram for explaining an example of a schematic flow of processing of the second example alteration of the first example embodiment. Descriptions of Steps S449 to S455 illustrated in FIG. 11 is the same as, for example, the descriptions of Steps S403 to S409 illustrated in FIG. 8. Therefore, overlapping descriptions will be omitted here, and only Steps S441 to S447 will be described.

The base station 200 transmits an X2 SETUP REQUEST message to the base station 100 (S441), and in response to this, the base station 100 transmits an X2 SETUP RESPONSE message to the base station 200 (S443). The X2 SETUP RESPONSE message includes beamforming configuration information related to a configuration of beamforming of the base station 100.

Further, the base station 200 transmits a measurement configuration including the beamforming configuration information to the terminal apparatus 300 (S445).

Based on the beamforming configuration information, the terminal apparatus 300 performs the measurements of reference signals transmitted by the base station 100 using the beamforming, and selects a preferred beamforming weight. Then, the terminal apparatus 300 transmits, to the base station 200 (serving base station), a measurement report including a weight index indicating the preferred beamforming weight (S447). The measurement report includes measurement results of the reference signals.

(3) Third Example Alteration

When the terminal apparatus 300 attempts the reconnection to the same target cell at the time when a handover of the terminal apparatus 300 fails, the base station 100 (first communication processing unit 141) may also receive an access signal of the terminal apparatus 300 based on the second beam related information, as in the above-described example of the first example embodiment.

Further, when the terminal apparatus 300 attempts the reconnection to the same target cell at the time when a handover of the terminal apparatus 300 fails, the terminal apparatus 300 (transmission processing unit 333) may also transmit an access signal to the base station 100 based on the resource information, as in the first example alteration of the first example embodiment.

Hereinabove, the example alterations of the first example embodiment have been described. Note that two or more of the first to third example alterations may be combined. That is, a combination of the technical features of two or more of the first to third example alterations may be introduced.

3. Second Example Embodiment

Next, a second example embodiment of the present invention will be described with reference to FIG. 12 to FIG. 16. The above-described first example embodiment is a specific example embodiment, but the second example embodiment is a more generalized example embodiment.

<3.1. Configuration of System>

Figure 12:
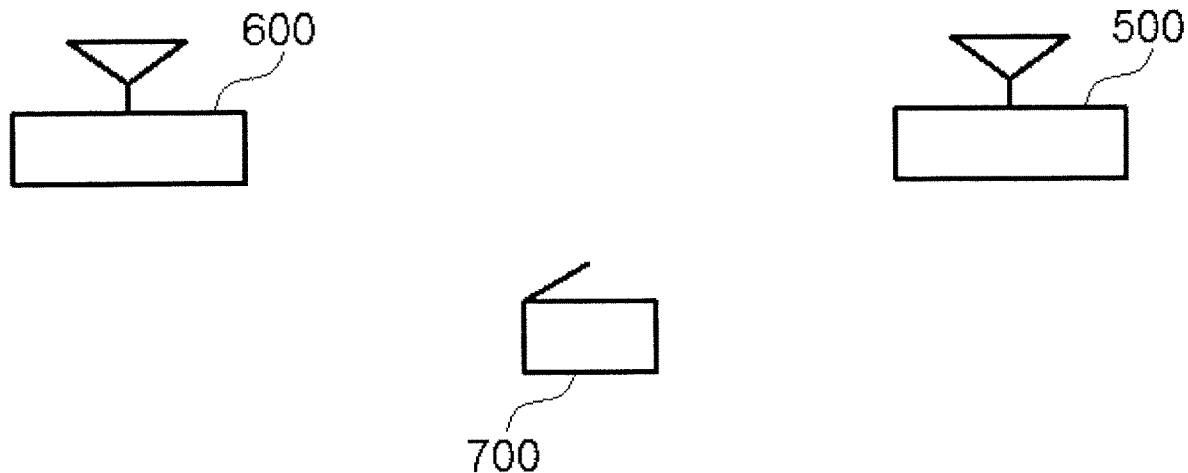
FIG. 12 is an explanatory diagram illustrating an example of the schematic configuration of a system according to a second example embodiment.

An example of the configuration of a system 2 according to the second example embodiment will be described with reference to FIG. 12. FIG. 12 is an explanatory diagram illustrating an example of the schematic configuration of the system 2 according to the second example embodiment. Referring to FIG. 12, the system 2 includes a base station 500, a base station 600, and a terminal apparatus 700.

For example, the system 2 may be a system conforming to the standard of 3GPP. More specifically, the system 2 may be, for example, a system conforming to the standard of the Fifth Generation (5G).

For example, descriptions of the base station 500, the base station 600, and the terminal apparatus 700 are the same as the descriptions of the base station 100, the base station 200, and the terminal apparatus 300 of the first example embodiment. Therefore, overlapping descriptions will be omitted here.

<3.2 Configuration of Base Station 500>

Figure 13:
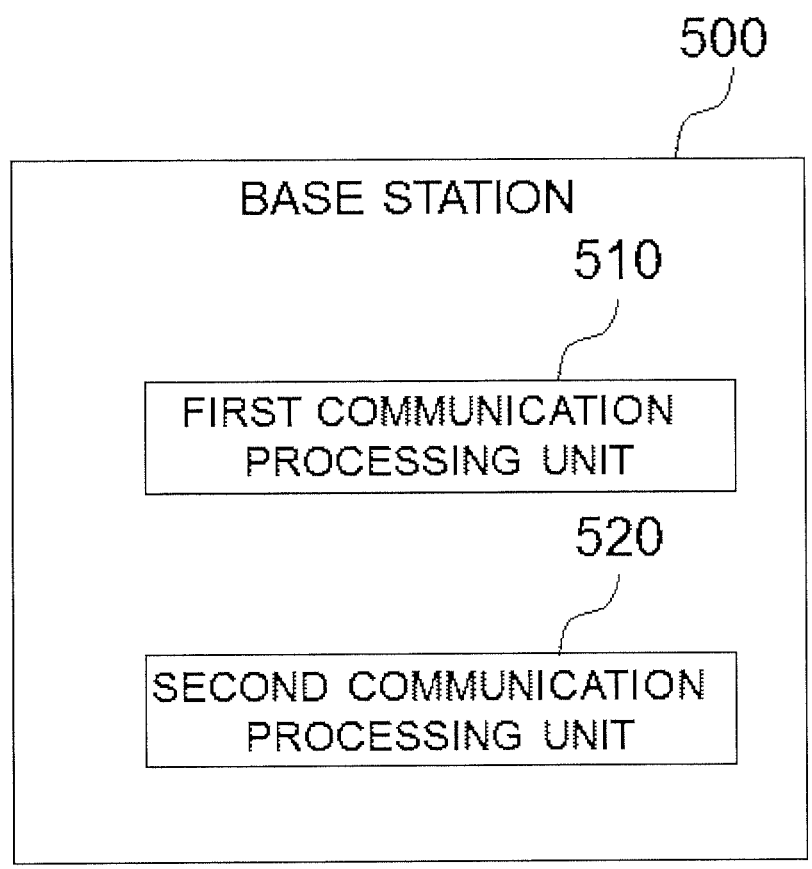
FIG. 13 is a block diagram illustrating an example of the schematic configuration of a first base station of the second example embodiment.

Next, an example of the configuration of the base station 500 of the second example embodiment will be described with reference to FIG. 13. FIG. 13 is a block diagram illustrating an example of the schematic configuration of the base station 50) of the second example embodiment. Referring to FIG. 13, the base station 500 includes a first communication processing unit 510 and a second communication processing unit 520.

Specific operations of the first communication processing unit 510 and the second communication processing unit 520 will be described later.

The first communication processing unit 510 and the second communication processing unit 520 may be implemented by a baseband (BB) processor and/or another processor, or the like. The first communication processing unit 510 and the second communication processing unit 520 may be implemented by the same processor or may be implemented separately by different processors.

The base station 500 may include a memory storing a program and one or more processors capable of executing the program. The one or more processors may perform the operations of the first communication processing unit 510 and the second communication processing unit 520. The program may be a program for causing the one or more processors to execute the operations of the first communication processing unit 510 and the second communication processing unit 520.

<3.3. Configuration of Base Station 600>

Figure 14:
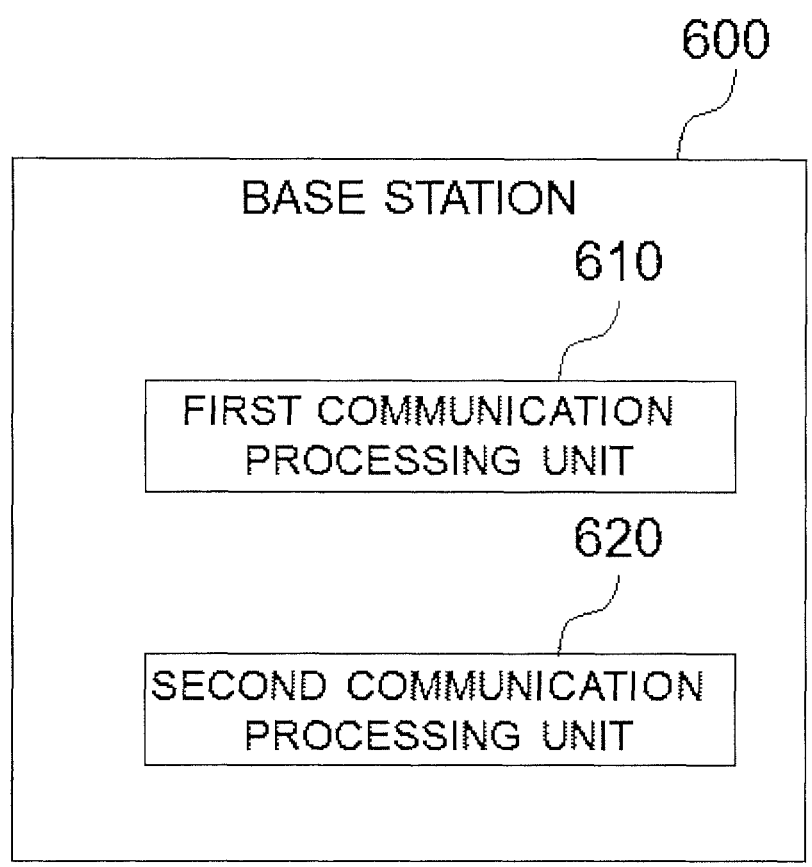
FIG. 14 is a block diagram illustrating an example of the schematic configuration of a second base station of the second example embodiment.

Next, an example of the configuration of the base station 600 of the second example embodiment will be described with reference to FIG. 14. FIG. 14 is a block diagram illustrating an example of the schematic configuration of the base station 600 of the second example embodiment. Referring to FIG. 14, the base station 600 includes a first communication processing unit 610 and a second communication processing unit 620.

Specific operations of the first communication processing unit 610 and the second communication processing unit 620 will be described later.

The first communication processing unit 610 and the second communication processing unit 620 may be implemented by a baseband (BB) processor and/or another processor, or the like. The first communication processing unit 610 and the second communication processing unit 620 may be implemented by the same processor or may be implemented separately by different processors.

The base station 600 may include a memory storing a program and one or more processors capable of executing the program. The one or more processors may perform the operations of the first communication processing unit 610 and the second communication processing unit 620. The program may be a program for causing the one or more processors to execute the operations of the first communication processing unit 610 and the second communication processing unit 620.

<3.4. Configuration of Terminal Apparatus 700>

Figure 15:
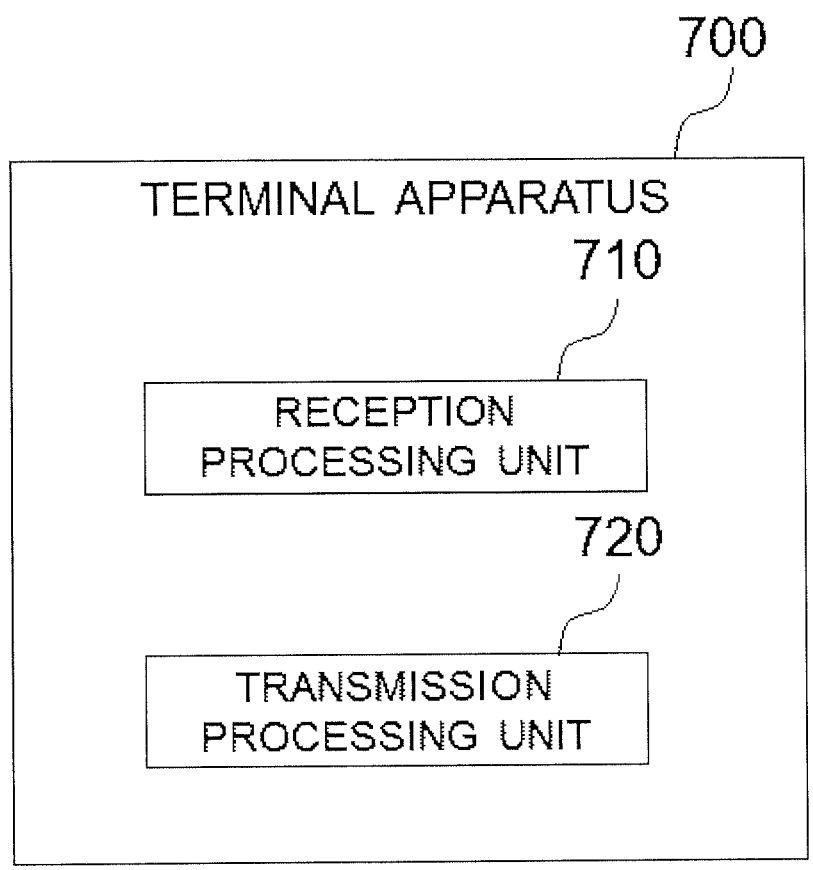
FIG. 15 is a block diagram illustrating an example of the schematic configuration of a terminal apparatus of the second example embodiment.

Next, an example of the configuration of the terminal apparatus 700 of the second example embodiment will be described with reference to FIG. 15. FIG. 15 is a block diagram illustrating an example of the schematic configuration of the terminal apparatus 700 of the second example embodiment. Referring to FIG. 15, the terminal apparatus 700 includes a reception processing unit 710 and a transmission processing unit 720.

Specific operations of the reception processing unit 710 and the transmission processing unit 720 will be described later.

The reception processing unit 710 and the transmission processing unit 720 may be implemented by a baseband (BB) processor and/or another processor, or the like. The reception processing unit 710 and the transmission processing unit 720 may be implemented by the same processor or may be implemented separately by different processors.

The terminal apparatus 700 may include a memory storing a program and one or more processors capable of executing the program. The one or more processors may perform the operations of the reception processing unit 710 and the transmission processing unit 720. The program may be a program for causing the one or more processors to execute the operations of the reception processing unit 710 and the transmission processing unit 720.

<3.5. Technical Features>

Next, technical features of the second example embodiment will be described with reference to FIG. 16.

In the second example embodiment, the base station 500 (first communication processing unit 510) transmits reference signals using beamforming. The terminal apparatus 700 (reception processing unit 710) receives the reference signals.

Further, the terminal apparatus 700 (transmission processing unit 720) transmits, to the base station 600, first beam related information related to a beam, the first beam related information being information for the base station 500, and the base station 600 (first communication processing unit 610) receives the first beam related information.

Further, a handover of the terminal apparatus 700 from the base station 600 (source base station) to the base station 500 (target) is performed. The base station 600 (second communication processing unit 620) transmits, to the base station 500, a handover message (for example, a HANDOVER REQUEST message) including second beam related information corresponding to the first beam related information, and the base station 500 (second communication processing unit 520) receives the handover message.

In particular, in the second example embodiment, the base station 500 (first communication processing unit 510) receives an access signal of the terminal apparatus 700 based on the second beam related information.

(1) Transmission of reference signals, measurement report, handover message, beam related information, reception of access signal, and meaning of "transmit"

For example, descriptions of the transmission of the reference signals, a measurement report, the handover message, the beam related information, the reception of the access signal, and the meaning of "transmit" in the second example embodiment are the same as the descriptions of these in the first example embodiment. Therefore, overlapping descriptions will be omitted here, and only an example of a schematic flow of processing will be described.

(2) Flow of processing

Figure 16:
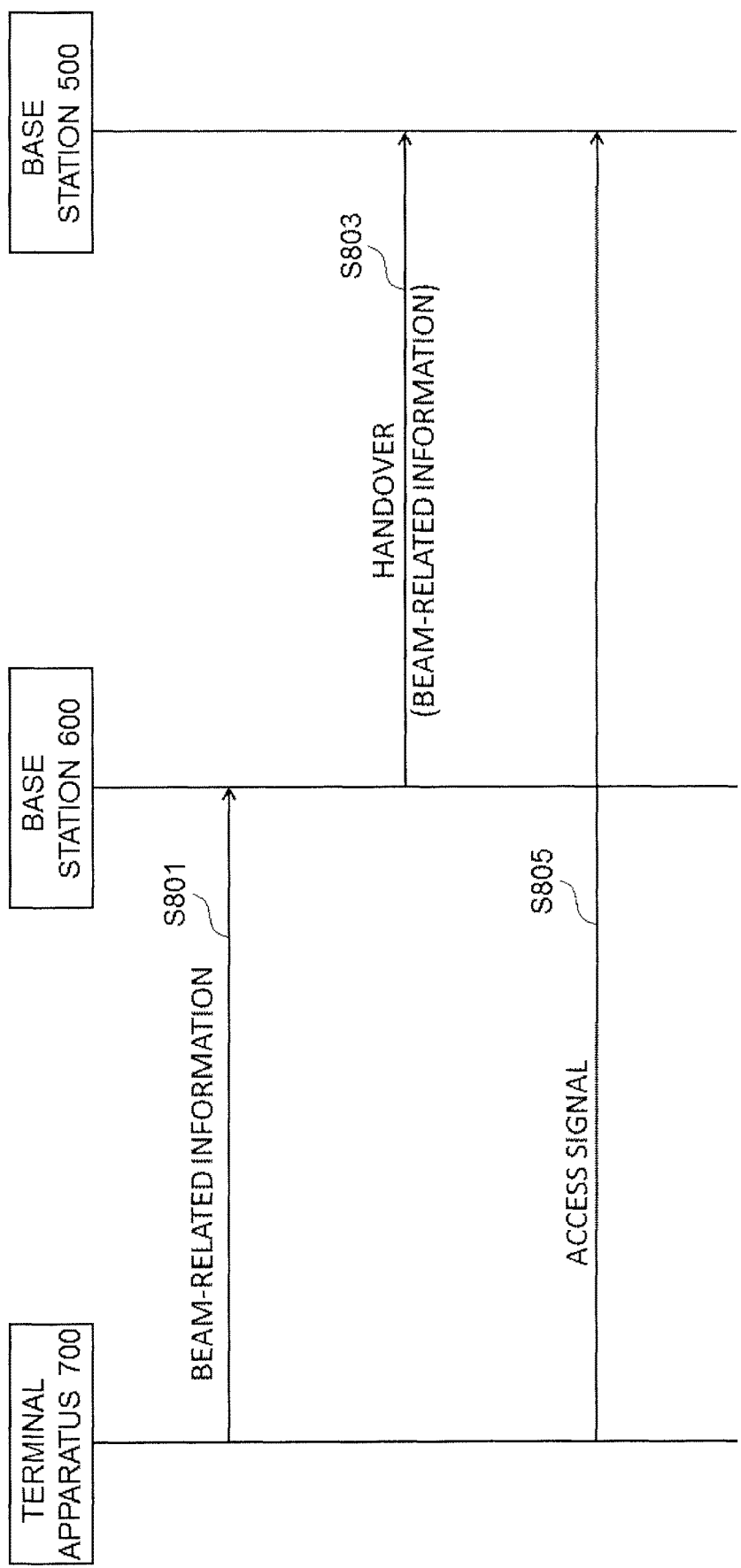
FIG. 16 is a sequence diagram for explaining an example of a schematic flow of processing of the second example embodiment.

FIG. 16 is a sequence diagram for explaining an example of the schematic flow of the processing according to the second example embodiment.

The terminal apparatus 700 transmits, to the base station 600, first beam related information related to a beam, the first beam related information being information for the base station 500, and the base station 600 receives the first beam related information (S801).

The base station 600 transmits, to the base station 500, a handover message (for example, a HANDOVER REQUEST message) including second beam related information corresponding to the first beam related information, and the base station 500 receives the handover message (S803).

The base station 500 receives an access signal of the terminal apparatus 7X based on the second beam related information (S805).

While the example embodiments of the present invention have been described above, the present invention is not limited to the above described example embodiments. It will be understood by those skilled in the art that the above described example embodiments are merely examples and various alterations and modifications can be made without departing from the scope and the spirit of the present invention.

For example, the steps in the processing described in the specification do not necessarily have to be executed in a time-series manner along the order described as the sequence diagrams. For example, the steps in the processing may be executed in a different order from the order described as the sequence diagrams or may be executed in parallel. Further, part of the steps in the processing may be deleted, and more steps may be added to the processing.

Further, apparatuses or modules thereof (for example, baseband processors or other chips) including the constituent elements (for example, the first communication processing units and/or the second communication processing units) of the base stations described in the specification may be provided. Similarly, modules (for example, baseband processors or other chips) including the constituent elements (for example, the reception processing unit and/or the transmission processing unit) of the terminal apparatus described in the specification may be provided. Further, methods each including the processing of the constituent elements may be provided, and programs each for causing a processor to execute the processing of the constituent elements may be provided. Further, recording mediums (computer-readable non-transitory recording mediums) each recording the program may be provided. As a matter of course, such apparatuses, modules, methods, programs and recording mediums are also included in the present invention.

Some or all of the above-described example embodiments can be described as the following supplementary notes, but are not limited to the following supplementary notes.

(Supplementary Note 1)

An apparatus including:

a first communication processing unit configured to transmit reference signals using beamforming; and a second communication processing unit configured to receive a handover message from a source base station of a handover of a terminal apparatus, wherein the handover message includes beam related information related to a beam, and wherein the first communication processing unit is configured to receive an access signal of the terminal apparatus based on the beam related information.

(Supplementary Note 2)

The apparatus according to supplementary note 1, wherein the first communication processing unit is configured to receive the access signal, using a set of beamforming weights that corresponds to the beam related information.

(Supplementary Note 3)

The apparatus according to supplementary note 1 or 2, wherein the access signal is an uplink signal in random access of the terminal apparatus.

(Supplementary Note 4)

The apparatus according to any one of supplementary notes 1 to 3, wherein the second communication processing unit is configured to transmit, to the source base station, resource information indicating a radio resource for transmitting the access signal.

(Supplementary Note 5)

The apparatus according to supplementary note 4, wherein the radio resource is a radio resource for a beam or a set of the beamforming weights that corresponds to the beam related information.

(Supplementary Note 6)

The apparatus according to supplementary note 4 or 5, wherein the second communication processing unit is configured to transmit, to the source base station, a response message to the handover message, and wherein the response message includes the resource information.

(Supplementary Note 7)

The apparatus according to any one of supplementary notes 4 to 6, wherein the second communication processing unit is configured to transmit, to the source base station, retransmission cycle information indicating a retransmission cycle of the access signal, with the resource information.

(Supplementary Note 8)

The apparatus according to any one of supplementary notes 4 to 7, wherein the resource information is information to be transmitted from the source base station to the terminal apparatus.

(Supplementary Note 9)

The apparatus according to any one of supplementary notes 1 to 8, wherein the first communication processing unit is configured to transmit reference signals by a plurality of beams.

(Supplementary Note 10)

The apparatus according to supplementary note 9, wherein the first communication processing unit is configured to transmit reference signals by the plurality of beams, using radio resources that are different for the respective beams.

(Supplementary Note 11)

The apparatus according to supplementary note 10, wherein the radio resources are frequency resources, time resources, or time-frequency resources.

(Supplementary Note 12)

The apparatus according to any one of supplementary notes 1 to 11, wherein the beam related information is information related to one of a plurality of beams.

(Supplementary Note 13)

The apparatus according to supplementary note 12, wherein the beam related information is information indicating one of the plurality of beams.

(Supplementary Note 14)

The apparatus according to supplementary note 12 or 13, wherein the beam related information is information indicating one of a plurality of sets of beamforming weights.

(Supplementary Note 15)

The apparatus according to any one of supplementary notes 1 to 14, wherein the beam related information corresponds to beam related information transmitted from the terminal apparatus to the source base station.

(Supplementary Note 16)

The apparatus according to any one of supplementary notes 1 to 15, wherein the second communication processing unit is configured to transmit, to the source base station, beamforming configuration information related to a configuration of beamforming.

(Supplementary Note 17)

The apparatus according to supplementary note 16, wherein the beamforming configuration information includes information indicating the number of beams and information indicating radio resources for respective beams for transmitting reference signals.

(Supplementary Note 18)

The apparatus according to supplementary note 16 or 17, wherein the beamforming configuration information is information to be transmitted from the source base station to the terminal apparatus.

(Supplementary Note 19)

The apparatus according to any one of supplementary notes 1 to 18, the apparatus being a base station, one or more apparatuses of a plurality of apparatuses included in a base station, or a module for one of the plurality of apparatuses.

(Supplementary Note 20)

An apparatus including:

a first communication processing unit configured to receive, from a terminal apparatus, first beam related information related to a beam, the first beam related information being information for a base station which transmits reference signals using beamforming; and a second communication processing unit configured to transmit, to the base station, a handover message including second beam related information corresponding to the first beam related information, wherein the second beam related information is information to be used by the base station to receive an access signal of the terminal apparatus.

(Supplementary Note 21)

The apparatus according to supplementary note 20, wherein the first communication processing unit is configured to transmit, to the terminal apparatus, resource information indicating a radio resource for transmitting the access signal.

(Supplementary Note 22)

The apparatus according to supplementary note 21, wherein the first communication processing unit is configured to transmit, to the terminal apparatus, retransmission cycle information indicating a retransmission cycle of the access signal, with the resource information.

(Supplementary Note 23)

The apparatus according to supplementary note 21 or 22, wherein the first communication processing unit is configured to transmit a HandoverCommand message to the terminal apparatus, and wherein the HandoverCommand message includes the resource information.

(Supplementary Note 24)

The apparatus according to any one of supplementary notes 21 to 23, wherein the second communication processing unit is configured to receive the resource information from the base station.

(Supplementary Note 25)

The apparatus according to any one of supplementary notes 21 to 23, wherein the first communication processing unit is configured to generate the resource information.

(Supplementary Note 26)

The apparatus according to any one of supplementary notes 20 to 25, wherein the second beam related information is information that is the same as the first beam related information.

(Supplementary Note 27)

The apparatus according to any one of supplementary notes 20 to 26, wherein the first beam related information and the second beam related information is information related to one of a plurality of beams.

(Supplementary Note 28)

The apparatus according to any one of supplementary notes 20 to 27, wherein the first communication processing unit is configured to receive a measurement report transmitted from the terminal apparatus, and wherein the measurement report includes the first beam related information, (Supplementary Note 29)

The apparatus according to any one of supplementary notes 20 to 28, wherein the second communication processing unit is configured to receive, from the base station, beamforming configuration information related to a configuration of beamforming of the base station, and wherein the first communication processing unit is configured to transmit the beamforming configuration information to the terminal apparatus.

(Supplementary Note 30)

The apparatus according to supplementary note 29, wherein the first communication processing unit is configured to transmit a measurement configuration to the terminal apparatus, and wherein the measurement configuration includes the beamforming configuration information.

(Supplementary Note 31)

The apparatus according to any one of supplementary notes 20 to 30, the apparatus being a base station, one or more apparatuses of a plurality of apparatuses included in the base station, or a module for one of the plurality of apparatuses.

(Supplementary Note 32)

An apparatus including:

a reception processing unit configured to receive reference signals transmitted by a first base station using beamforming; and a transmission processing unit configured to transmit, to a second base station, first beam related information related to a beam, the first beam related information being information for the first base station, wherein the first beam related information corresponds to second beam related information to be used by the first base station to receive an access signal.

(Supplementary Note 33)

The apparatus according to supplementary note 32, wherein the reception processing unit is configured to receive, from the second base station, resource information indicating a radio resource for transmitting an access signal, and wherein the transmission processing unit transmits an access signal to the first base station based on the resource information.

(Supplementary Note 34)

The apparatus according to supplementary note 33.

wherein the reception processing unit is configured to receive, from the second base station, retransmission cycle information indicating a retransmission cycle of the access signal, with the resource information, and wherein the transmission processing unit is configured to retransmit the access signal to the first base station based on the retransmission cycle information.

(Supplementary Note 35)

The apparatus according to any one of supplementary notes 32 to 34, wherein the transmission processing unit is configured to transmit a measurement report to the second base station, and wherein the measurement report includes the first beam related information.

(Supplementary Note 36)

The apparatus according to supplementary note 35, wherein the measurement report includes measurement results of reference signals transmitted by the first base station using the beamforming.

(Supplementary Note 37)

The apparatus according to any one of supplementary notes 32 to 36, wherein the reception processing unit is configured to receive, from the second base station, beamforming configuration information related to a configuration of beamforming of the first base station, and wherein the reception processing unit is configured to receive reference signals transmitted by the first base station using beamforming, based on the beamforming configuration information.

(Supplementary Note 38)

The apparatus according to any one of supplementary notes 32 to 37, wherein the apparatus is a terminal apparatus or a module for a terminal apparatus.

(Supplementary Note 39)

A method including:

transmitting reference signals using beamforming;

receiving a handover message from a source base station of a handover of a terminal apparatus, the handover message including beam related information related to a beam; and receiving an access signal of the terminal apparatus based on the beam related information.

(Supplementary Note 40)

A method including:

receiving, from a terminal apparatus, first beam related information related to a beam, the first beam related information being information for a base station which transmits reference signals using beamforming; and transmitting, to the base station, a handover message including second beam related information corresponding to the first beam related information, wherein the second beam related information is information to be used by the base station to receive an access signal of the terminal apparatus, (Supplementary Note 41)

A method including:

receiving reference signals transmitted by a first base station using beamforming; and transmitting, to a second base station, first beam related information related to a beam, the first beam related information being information for the first base station, wherein the first beam related information corresponds to second beam related information to be used by the first base station to receive an access signal.

(Supplementary Note 42)

A system including:

a first base station;

a second base station; and a terminal apparatus, wherein the first base station transmits reference signals using beamforming, wherein the terminal apparatus receives the reference signals, and transmits, to the second base station, first beam related information related to a beam, the first beam related information being information for the first base station, wherein the second base station transmits, to the first base station, a handover message including second beam related information corresponding to the first beam related information, and wherein the first base station receives an access signal of the terminal apparatus based on the second beam related information.

(Supplementary Note 43)

A program for causing a processor to execute:

transmitting reference signals using beamforming;

receiving a handover message from a source base station of a handover of a terminal apparatus, the handover message including beam related information related to a beam; and receiving an access signal of the terminal apparatus based on the beam related information.

(Supplementary Note 44)

A program for causing a processor to execute:

receiving, from a terminal apparatus, first beam related information related to a beam, the first beam related information being information for a base station which transmits reference signals using beamforming; and transmitting, to the base station, a handover message including second beam related information corresponding to the first beam related information, wherein the second beam related information is information to be used by the base station to receive an access signal of the terminal apparatus.

(Supplementary Note 45)

A program for causing a processor to execute:

receiving reference signals transmitted by a first base station using beamforming; and transmitting, to a second base station, first beam related information related to a beam, the first beam related information being information for the first base station, wherein the first beam related information corresponds to second beam related information to be used by the first base station to receive an access signal.

(Supplementary Note 46)

A computer-readable non-transitory recording medium having recorded thereon a program for causing a processor to execute:

transmitting reference signals using beamforming;

receiving a handover message from a source base station of a handover of a terminal apparatus, the handover message including beam related information related to a beam; and receiving an access signal of the terminal apparatus based on the beam related information.

(Supplementary Note 47)

A computer-readable non-transitory recording medium having recorded thereon a program for causing a processor to execute:

receiving, from a terminal apparatus, first beam related information related to a beam, the first beam related information being information for a base station which transmits reference signals using beamforming; and transmitting, to the base station, a handover message including second beam related information corresponding to the first beam related information, wherein the second beam related information is information to be used by the base station to receive an access signal of the terminal apparatus.

(Supplementary Note 48)

A computer-readable non-transitory recording medium having recorded thereon a program for causing a processor to execute:

receiving reference signals transmitted by a first base station using beamforming; and transmitting, to a second base station, first beam related information related to a beam, the first beam related information being information for the first base station, wherein the first beam related information corresponds to second beam related information to be used by the first base station to receive an access signal.

This application is based upon and claims the benefit of priority from Japanese Patent Application No. 2016-152618, filed on Aug. 3, 2016; the entire contents of which are incorporated herein by reference.

INDUSTRIAL APPLICABILITY

In a mobile communication system, it is possible to increase a possibility of a success in a handover.

REFERENCE SIGNS LIST 1, 2 system
10, 20 cell/coverage area
11 beam
30 beam search period
100, 200, 500, 600 base station
141, 241, 510, 610 first communication processing unit
143, 243, 520, 620 second communication processing unit
300,700 terminal apparatus
331.710 reception processing unit
333,720 transmission processing unit

What is claimed is:

1. A method of a terminal apparatus configured to communicate with a first base station comprising:
performing measurements of signals transmitted by a second base station using at least one beam;
transmitting, to the first base station, first information indicating results of the measurements;
receiving a RRC message relating to RRC Reconfiguration the first base station, the RRC message relating to RRC Reconfiguration including second information related to a beam;
the RRC message relating to RRC Reconfiguration on message being a message transmitted to the terminal apparatus by the first base station, the RRC message relating to RRC Reconfiguration included in a HANDOVER REQUEST ACKNOWLEDGE message that is transmitted from the second base station to the first base station in response to a HANDOVER REQUEST message including the first information after the HANDOVER REQUEST message is transmitted from the first base station to the second base station; and
transmitting, to the second base station, a random access preamble signal based on the second information.

2. The method according to claim 1, wherein the first information includes index information indicating the beam and information related to quality of the beam.

3. The method according to claim 1, further comprising:
receiving, from the first base station, information related to the number of beams transmitted by the second base station.

4. The method according to claim 1, wherein the RRC message relating to RRC Reconfiguration includes resource information indicating a radio resource for transmitting the random access preamble signal.

5. The method according to claim 4, wherein the resource information is information to be transferred from the first base station to the terminal apparatus.

6. The method according to claim 4, further comprising:
receiving, from the first base station, retransmission cycle information indicating a retransmission cycle of the random access preamble signal, with the resource information.

7. The method according to claim 1, wherein the measurements includes measurements of reference signals transmitted using a plurality of beams.

8. The method according to claim 1, wherein the second information is information related to one of a plurality of beams.

9. A method of a first base station configured to communicate with a terminal apparatus comprising:
receiving, from the terminal apparatus, first information indicating results of measurements, the measurements performed by the terminal apparatus and the results of the measurements indicating results of measurements of signals transmitted by a second base station using at least one beam;
transmitting a RRC message relating to RRC Reconfiguration message to the terminal apparatus, the RRC message relating to RRC Reconfiguration message including second information related to a beam;
wherein the RRC message relating to RRC Reconfiguration message is included in a HANDOVER REQUEST ACKNOWLEDGE message that is transmitted from the second base station to the first base station in response to a HANDOVER REQUEST message including the first information after the HANDOVER REQUEST message is transmitted from the first base station to the second base station; and
wherein the terminal apparatus transmits, to the second base station, a random access preamble signal based on the second information.

10. A method of a second base station configured to communicate with a terminal apparatus comprising:
transmitting signals to the terminal apparatus using at least one beam;
receiving, from a first base station, a HANDOVER REQUEST message including first information indicating results of measurements, the measurements performed by the terminal apparatus and the results of the measurements indicating results of measurements of signals transmitted by a second base station using at least one beam;
transmitting, to the first base station, a HANDOVER REQUEST ACKNOWLEDGE message including a RRC message relating to RRC Reconfiguration message in response to the HANDOVER REQUEST message, the RRC message relating to RRC Reconfiguration message including second information related to a beam and the RRC message relating to RRC Reconfiguration message transmitted to the terminal apparatus from the first base station; and
wherein the terminal apparatus transmits, to the second base station, a random access preamble signal based on the second information.

* * * * *